United States Patent
Taura et al.

(10) Patent No.: US 11,278,795 B2
(45) Date of Patent: Mar. 22, 2022

(54) STORAGE MEDIUM, INFORMATION PROCESSING SYSTEM, INFORMATION PROCESSING APPARATUS AND GAME CONTROLLING METHOD WITH MAIN AND SUB-CHARACTER CONTROL

(71) Applicant: NINTENDO CO., LTD., Kyoto (JP)

(72) Inventors: Takahisa Taura, Osaka (JP); Kaori Ando, Kyoto (JP); Makoto Okazaki, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 348 days.

(21) Appl. No.: 16/711,805

(22) Filed: Dec. 12, 2019

(65) Prior Publication Data
US 2020/0254335 A1    Aug. 13, 2020

(30) Foreign Application Priority Data

Feb. 13, 2019    (JP) .............................. JP2019-023141

(51) Int. Cl.
*A63F 13/56*    (2014.01)
*A63F 13/58*    (2014.01)
(Continued)

(52) U.S. Cl.
CPC ............ *A63F 13/23* (2014.09); *A63F 13/211* (2014.09); *A63F 13/2145* (2014.09);
(Continued)

(58) Field of Classification Search
CPC .......... A63F 13/56; A63F 13/58; A63F 13/23; A63F 13/211; A63F 13/2145;
(Continued)

(56) References Cited

U.S. PATENT DOCUMENTS

2002/0119811 A1* 8/2002 Yabe ..................... A63F 13/10
463/8
2013/0095921 A1    4/2013 Shikata et al.
(Continued)

FOREIGN PATENT DOCUMENTS

JP    2003-47767    2/2003
JP    2013-85663    5/2013
(Continued)

OTHER PUBLICATIONS

Notification of Reason(s) for Refusal dated Feb. 2, 2021 issued in Japanese Application No. 2019-023141 (5 pgs.) and translation (5 pgs.).
(Continued)

*Primary Examiner* — Robert T Clarke, Jr.
(74) *Attorney, Agent, or Firm* — Nixon & Vanderhye PC

(57) ABSTRACT

A game system that is a non-limiting example information processing system comprises a main body apparatus, and this main body apparatus is provided with a left controller and a right controller in a attachable and detachable manner. Each of the left controller and the right controller comprises a plurality of operation buttons and an analog stick. In a first operation mode, action of a player character is controlled according to an operation of a player. In a second operation mode, a sub-character appears, and action of the sub-character is automatically controlled except for a case where the sub-character attacks an enemy character according to depression of a ZL-button. In a third operation mode, movement of the player character and movement of the sub-character are respectively controlled according to an operation of the player.

18 Claims, 20 Drawing Sheets

(51) Int. Cl.
   *A63F 13/42* (2014.01)
   *A63F 13/23* (2014.01)
   *A63F 13/211* (2014.01)
   *A63F 13/2145* (2014.01)
   *A63F 13/24* (2014.01)
   *A63F 13/428* (2014.01)

(52) U.S. Cl.
   CPC ............ *A63F 13/24* (2014.09); *A63F 13/428* (2014.09); *A63F 13/58* (2014.09); *A63F 2300/6045* (2013.01); *A63F 2300/64* (2013.01)

(58) Field of Classification Search
   CPC ........ A63F 13/24; A63F 13/428; A63F 13/42; A63F 2300/6045; A63F 2300/64
   See application file for complete search history.

(56) References Cited

U.S. PATENT DOCUMENTS

| | | |
|---|---|---|
| 2018/0197334 A1 | 7/2018 | Kitazono |
| 2018/0353857 A1 | 12/2018 | Ito et al. |

FOREIGN PATENT DOCUMENTS

| | | |
|---|---|---|
| JP | 2018-112789 | 7/2018 |
| JP | 2019-221 | 1/2019 |
| WO | 2017/218303 A1 | 12/2017 |

OTHER PUBLICATIONS

Shining Wind, Famitsu PLAYSTATION+, published by ENTERBRAIN, on Jul. 1, 2007, vol. 234, pp. 26-45 (22 pgs.).

"Devil May Cry 5" Latest Build Play Report. The third man "V" is a Chuuni-kei New Hero, who fights in a cool way employing three magical beasts, 4Gamer. Net [online], dated Feb. 7, 2019, especially, see the section of "The third hero, 'V' finally appeared" [searched on Jan. 25, 2021], URL, https://www.4gamer.net/games/422/G042238/20190205097/, (11 pages).

[Xenoblade2] About Kizuna Let's understand the differences among Kizuna Talk, Kizuna Ring, and Kizuna!, Denfamiwiki [online], dated Dec. 5, 2017, especially, see the section of "What is Kizuna?" [searched on Jan. 25, 2021], URL, https ://wiki.denfaminicogamer.jp/Xenoblade2/%E3%82%AD%E3%82%BA%E3%83%8A%E3%82%B7%E3%82%B9%E3%83%86%E3%83%AO%E3%81%A3%E3%81%A6%E3%81%AA%E 3%81%AB%EF%BC%9F (document showing well known prior art), (2 pages).

Mammoth Marutani, Assassin's Creed III, FamitsuWii U, published by ENTERBRAIN, on Dec. 6, 2012, vol. 27, pp. 40-41 (document showing well-known prior art) (4 pgs.).

\* cited by examiner

GAME SCREEN (FIRST OPERATION MODE)   200

GAME SCREEN (SECOND OPERATION MODE)    200

210    212  204        202

GAME SCREEN (THIRD OPERATION MODE)    200

210   204   212   202

STORAGE MEDIUM, INFORMATION PROCESSING SYSTEM, INFORMATION PROCESSING APPARATUS AND GAME CONTROLLING METHOD WITH MAIN AND SUB-CHARACTER CONTROL

CROSS REFERENCE OF RELATED APPLICATION

The disclosure of Japanese Patent Application No. 2019-023141 filed on Feb. 13, 2019 is incorporated herein by reference.

FIELD

This application describes a storage medium, an information processing system, an information processing apparatus and a game controlling method, in which one or two characters can be controlled according to an operation of a player.

SUMMARY

It is a primary object of an embodiment(s) to provide a novel storage medium, information processing system, information processing apparatus and game controlling method.

It is another object of the embodiment(s) to provide a storage medium, information processing system, information processing apparatus and game controlling method, capable of playing with a simple operation as needed while allowing many variations of the operation.

A first embodiment is a non-transitory computer-readable storage medium having stored therein an information processing program executable by a computer of an information processing apparatus, wherein the information processing program causes one or more processors of the computer to execute: acquiring of operation data based on an operation input to an operation device by a player; and controlling of a player character in a virtual space based on the operation data, in the controlling of the player character based on the operation data, in a first operation mode, controlling the player character based on a first operation input, and in response to a first switching instruction input, making a sub-character appear in the virtual space and shifting to a second operation mode, in the second operation mode, controlling the player character based on the first operation input, automatically controlling an action of at least a part of the sub-character, and in response to a second switching instruction input, shifting to a third operation mode, and in the third operation mode, controlling the player character based on the first operation input, and controlling movement of at least the sub-character based on a second operation input.

According to the first embodiment, it is possible to switch between the first mode that one character is controlled and the second mode that two characters are controlled, and furthermore, it is possible to select, in controlling the two characters, whether the sub-character is to be operated directly or automatically. That is, while it is possible to increase variation of operation, it is possible to play with a simple operation as necessary. For example, when it is felt that the operation is complicated or in a scene where a complicated operation is not needed, it is possible to play by switching to the simple operation.

A second embodiment is the storage medium according to the first embodiment, wherein the information processing program further causes the one or more processors of the computer to execute: storing of a parameter relevant to the sub-character into a memory of the information processing apparatus; decreasing the parameter in the second operation mode and the third operation mode; increasing the parameter in the first operation mode; and shifting to the first operation mode while erasing the sub-character when the parameter is decreased to a predetermined value in the second operation mode or the third operation mode.

According to the second embodiment, since there is necessity of switching the operation mode according to a value of the parameter, it is possible to provide strategy of switching the operation mode according to a situation. Moreover, since it is not necessary to perform only complicated operations, it is possible to provide variation in the operation.

A third embodiment is the storage medium according to the second embodiment, wherein the information processing program further causes the one or more processors of the computer to execute: erasing the sub-character and shifting to the first operation mode in response to a third switching instruction input in the second operation mode or the third operation mode.

A fourth embodiment is the storage medium according to the first embodiment, wherein the operation device is provided with a first direction input portion and a second direction input portion, and the first operation input is a direction input to the first direction input portion, and the second operation input is a direction input to the second direction input portion.

According to the fourth embodiment, it is possible to operate the two characters by the direction inputs, respectively.

A fifth embodiment is the storage medium according to the fourth embodiment, wherein the information processing program further causes the one or more processors of the computer to execute: controlling of a virtual camera based on the second operation input in the first operation mode and the second operation mode; and automatically controlling of the virtual camera based on positions of the player character and the sub-character in the third operation mode.

According to the fifth embodiment, it is possible to prevent simultaneous inputs of the direction inputs from being excessively increased by automatically controlling the camera during complicated operations. Therefore, it is possible to prevent the operation from becoming complicated too much.

A sixth embodiment is the storage medium according to the first embodiment, wherein a connection object that connects the player character and the sub-character is connected to the sub-character, and the information processing program further causes the one or more processors of the computer to execute: controlling of the connection object according to positions and motion of the player character and the sub-character in the second operation mode or the third operation mode.

According to the sixth embodiment, it is possible to operate the connection object by operating the two characters.

A seventh embodiment is the storage medium according to the first embodiment, wherein the information processing program further causes the one or more processors of the computer to execute: making the player character attack an enemy character in the virtual space based on an attack instruction input.

An eighth embodiment is the storage medium according to the seventh embodiment, wherein a connection object that connects the player character and the sub-character is connected to the sub-character, and the information processing program further causes the one or more processors of the computer to execute: controlling of the connection object according to positions and motion of the player character and the sub-character in the second operation mode or the third operation mode; and making the player character and the sub-character perform predetermined action based on a positional relationship between the connection object and the enemy character.

According to the eighth embodiment, it is possible to make at least the player character attack the enemy character based on the positional relationship with the enemy character, by operating the connection object by operating the two characters, for example.

A ninth embodiment is the storage medium according to the first embodiment, wherein the second switching instruction input is continuation of an input to a predetermined key of the operation device, and the information processing program further causes the one or more processors of the computer to execute: shifting to the second operation mode when the input to the predetermined key is canceled in the third operation mode.

According to the ninth embodiment, it is possible to control the movement of the player character and the sub-character based on the operation input only when the input to the predetermined key is continued.

A tenth embodiment is an information processing system comprising one or more processors and an operation portion, wherein the one or more processors are configured to execute: acquiring of operation data based on an operation input to the operation portion; and controlling of a player character in a virtual space based on the operation data, in the controlling of the player character based on the operation data, in a first operation mode, controlling the player character based on a first operation input, and in response to a first switching instruction input, making a sub-character appear in the virtual space and shifting to a second operation mode, in the second operation mode, controlling the player character based on the first operation input, automatically controlling an action of at least a part of the sub-character, and in response to a second switching instruction input, shifting to a third operation mode, and in the third operation mode, controlling the player character based on the first operation input, and controlling movement of at least the sub-character based on a second operation input.

An eleventh embodiment is an information processing apparatus comprising one or more processors, wherein the one or more processors execute: acquiring of operation data based on an operation input to an operation device by a player; and controlling of a player character in a virtual space based on the operation data, in the controlling of the player character based on the operation data, in a first operation mode, controlling the player character based on a first operation input, and in response to a first switching instruction input, making a sub-character appear in the virtual space and shifting to a second operation mode, in the second operation mode, controlling the player character based on the first operation input, automatically controlling an action of at least a part of the sub-character, and in response to a second switching instruction input, shifting to a third operation mode, and in the third operation mode, controlling the player character based on the first operation input, and controlling movement of at least the sub-character based on a second operation input.

A twelfth embodiment is a game controlling method, comprising: acquiring of operation data based on an operation input to an operation device by a player; and controlling of a player character in a virtual space based on the operation data, in the controlling of the player character based on the operation data, in a first operation mode, controlling the player character based on a first operation input, and in response to a first switching instruction input, making a sub-character appear in the virtual space and shifting to a second operation mode, in the second operation mode, controlling the player character based on the first operation input, automatically controlling an action of at least a part of the sub-character, and in response to a second switching instruction input, shifting to a third operation mode, and in the third operation mode, controlling the player character based on the first operation input, and controlling movement of at least the sub-character based on a second operation input.

According to each of the tenth to twelfth embodiments, similar to the first embodiment, while it is possible to increase variation of operation, it is possible to play with a simple operation as necessary when it is felt that the operation is complicated.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

A non-limiting example game system according to an exemplary embodiment will be described in the following. The non-limiting example game system 1 according to this embodiment comprises a main body apparatus (an information processing apparatus that functions as a game apparatus main body in this embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to this embodiment will be described, and then, the control of the game system 1 of this embodiment will be described.

Figure 1:
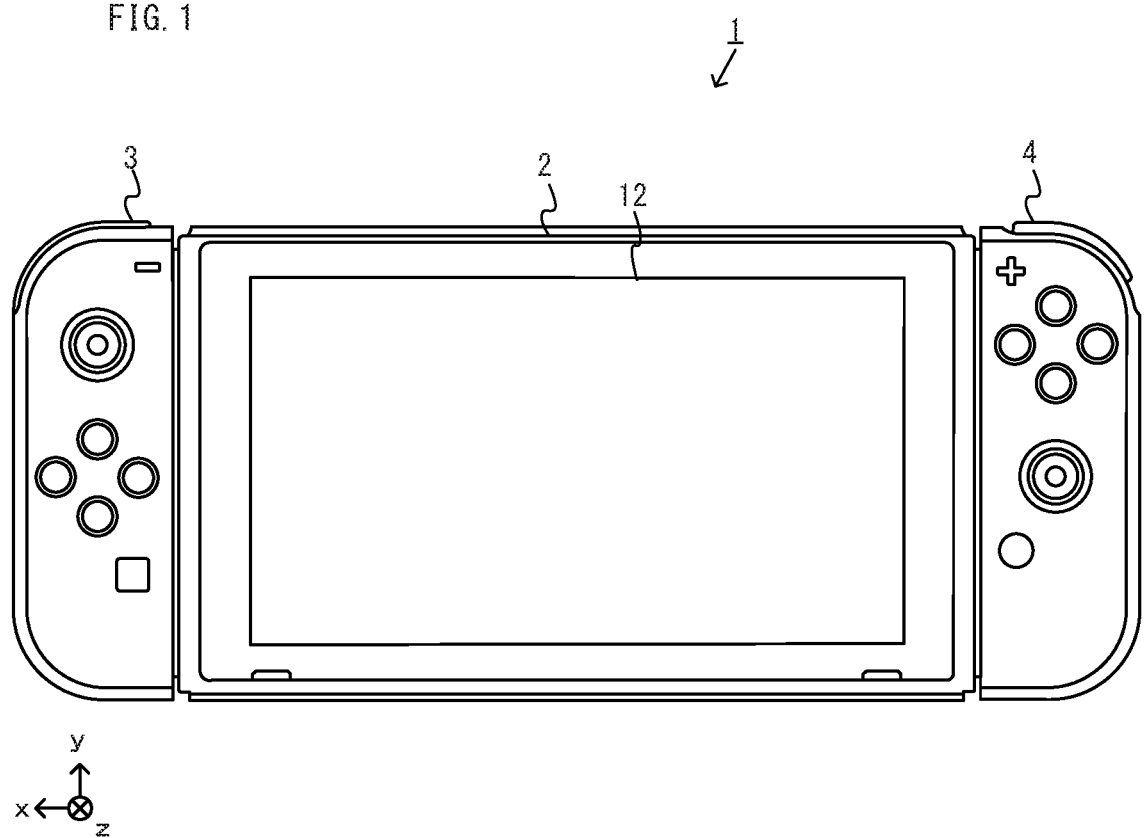
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
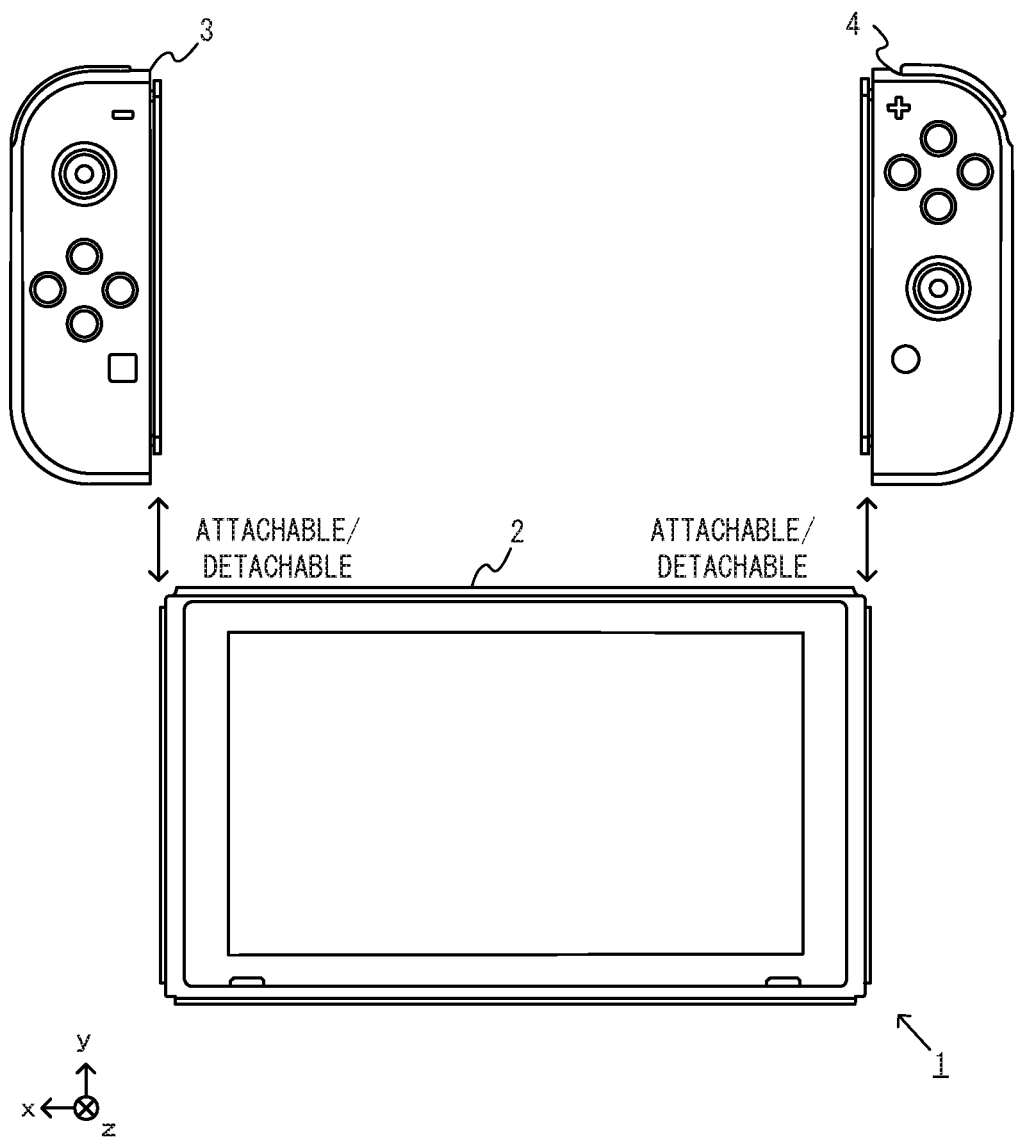
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
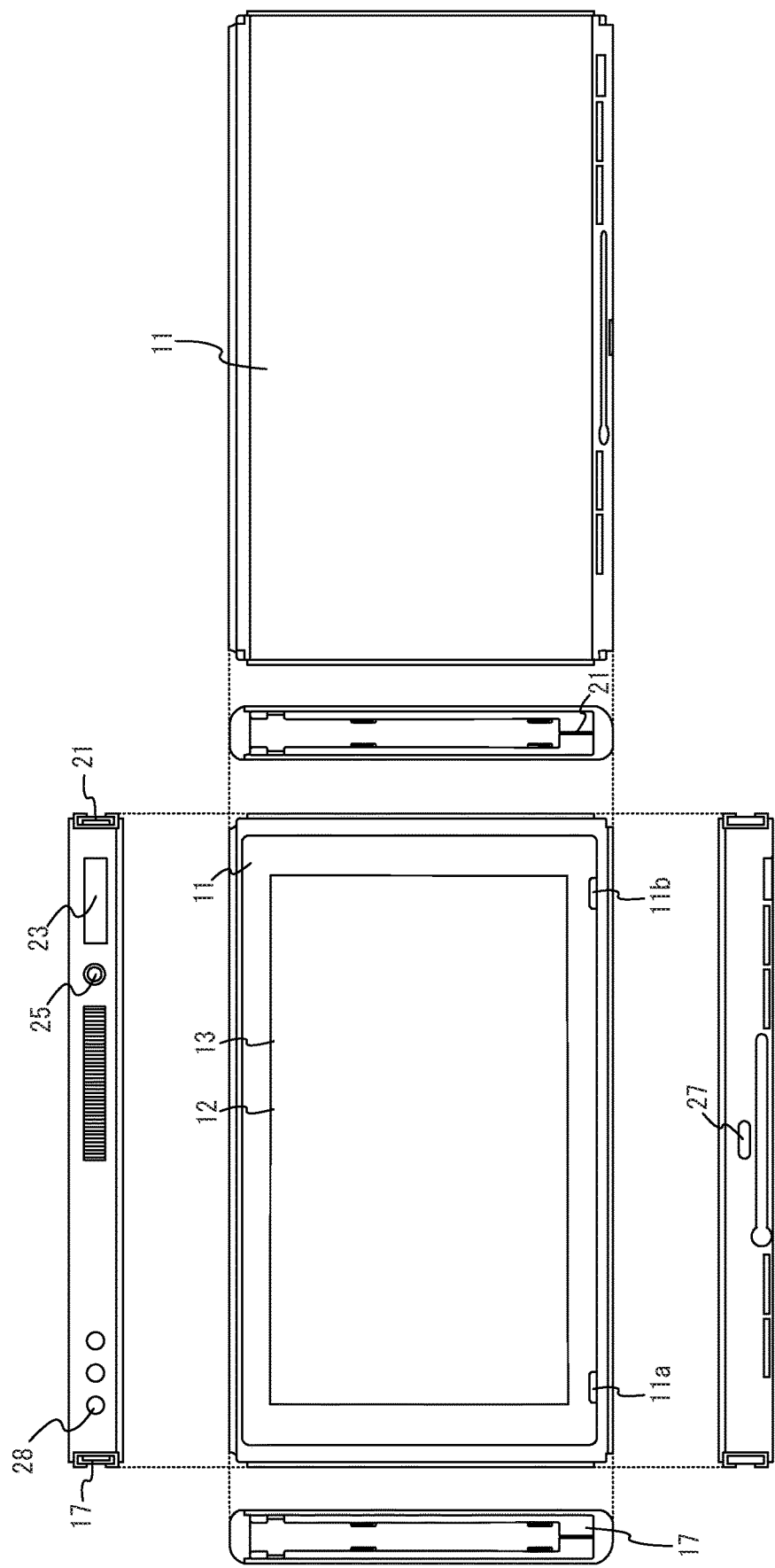
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In this embodiment, a main surface (in other words, a surface on a front side, i.e., a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In this embodiment, the display 12 is a liquid crystal display device (LCD). However, the display 12 may be an arbitrary type display.

Moreover, the main body apparatus 2 comprises a touch panel 13 on a screen of the display 12. In this embodiment, the touch panel 13 is of a type that allows a multi-touch input (e. g., a capacitive type). However, the touch panel 13 may be of any type, and for example, the touch panel 13 may be of a type that allows a single-touch input (e. g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are emitted through the speaker holes 11a and 11b.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e. g., a dedicated memory card) for the game system 1 or an information processing apparatus of the same type as the game system 1. The predetermined type of storage medium is used to store, for example, data (e. g., saved data of an application or the like) used by the main body apparatus 2 and/or a program (e. g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In this embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in this embodiment, the cradle has the function of charging the unified apparatus or the main body apparatus 2 alone that is put on the cradle. Moreover, the cradle has a function of a hub device (specifically, a USB hub).

Figure 4:
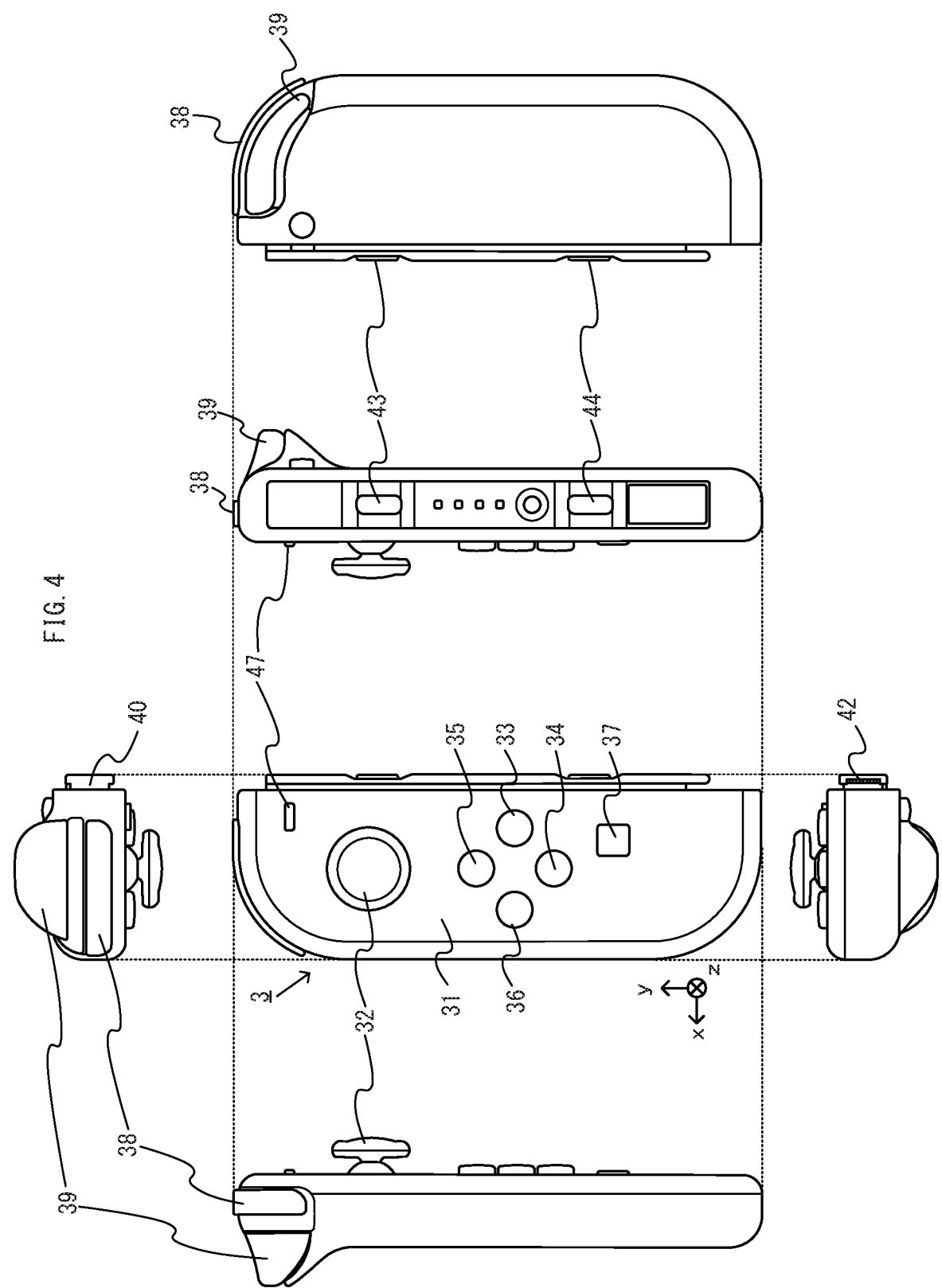
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In this embodiment, the housing 31 has a vertically long shape, i.e., is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in this embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e. g., an OS program and an application program) executed by the main body apparatus 2.

Moreover, the left controller 3 comprises a terminal 42 for the left controller 3 to perform wired communication with the main body apparatus 2.

Figure 5:
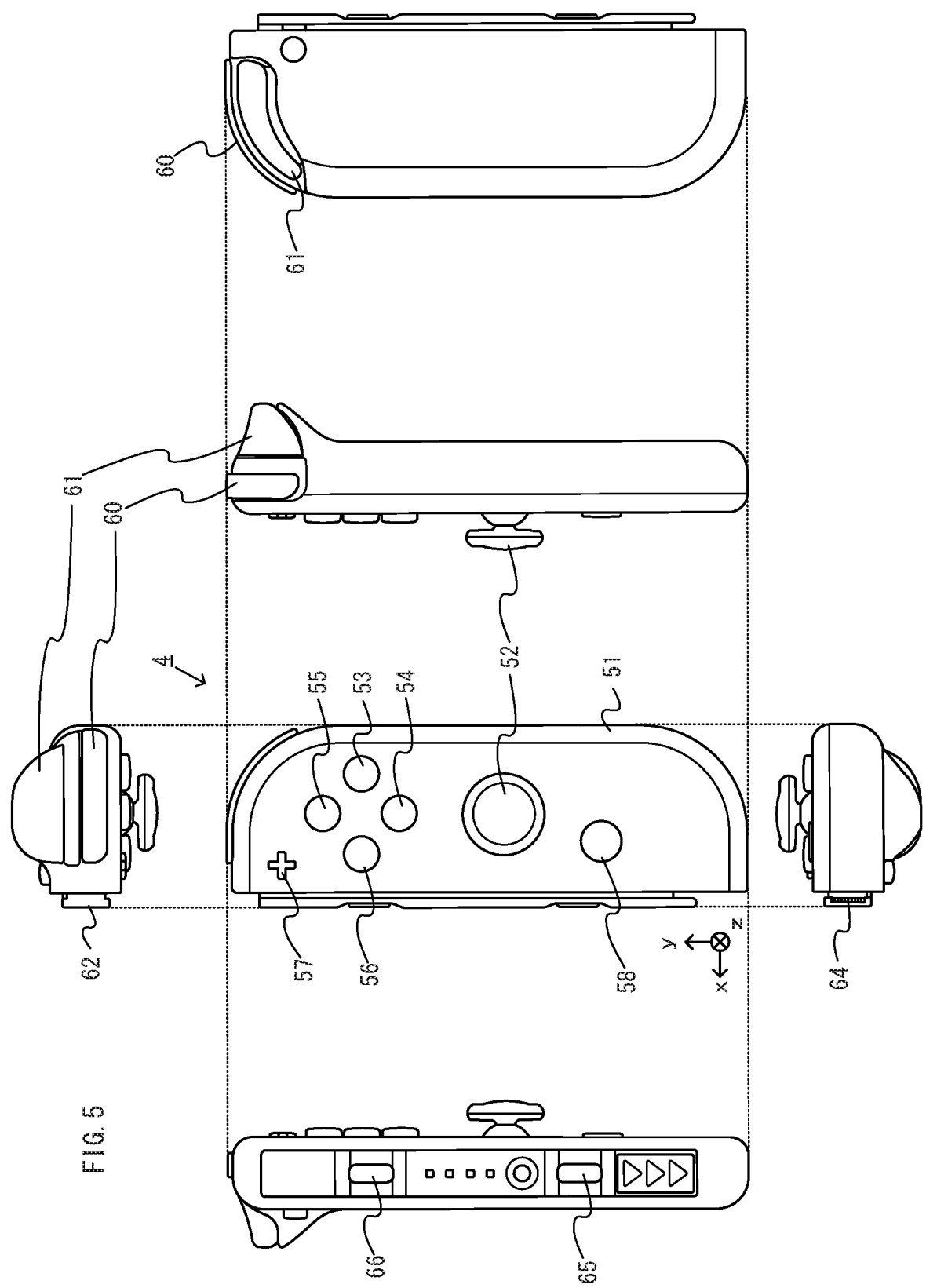
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In this embodiment, the housing 51 has a vertically long shape, i.e., a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In this embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
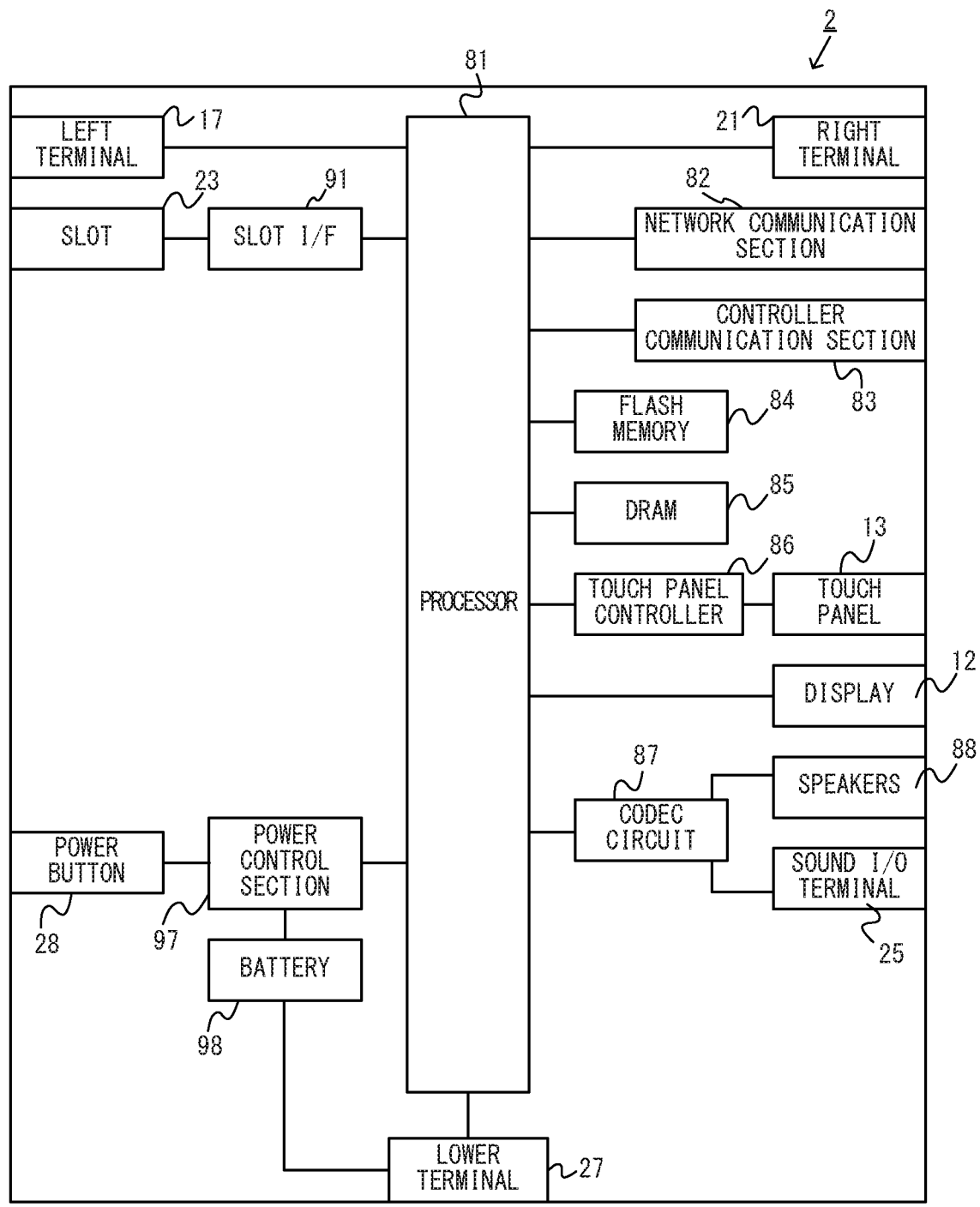
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e. g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e. g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In this embodiment, as a first communication manner, the network communication section 82 is connected to a wireless LAN to perform communication with external apparatus by a system in conformity with the Wi-Fi standard. Moreover, as a second communication manner, the network communication section 82 performs wireless communication with a further main body apparatus 2 of the same type by a predetermined communication system (e. g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed local network area, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in this embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in this embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e. g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e. g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e. g., the cradle) is connected to the lower terminal 27, and power is supplied to the main body apparatus 2 via the lower terminal 27, the battery 98 is charged with the supplied power.

Figure 7:
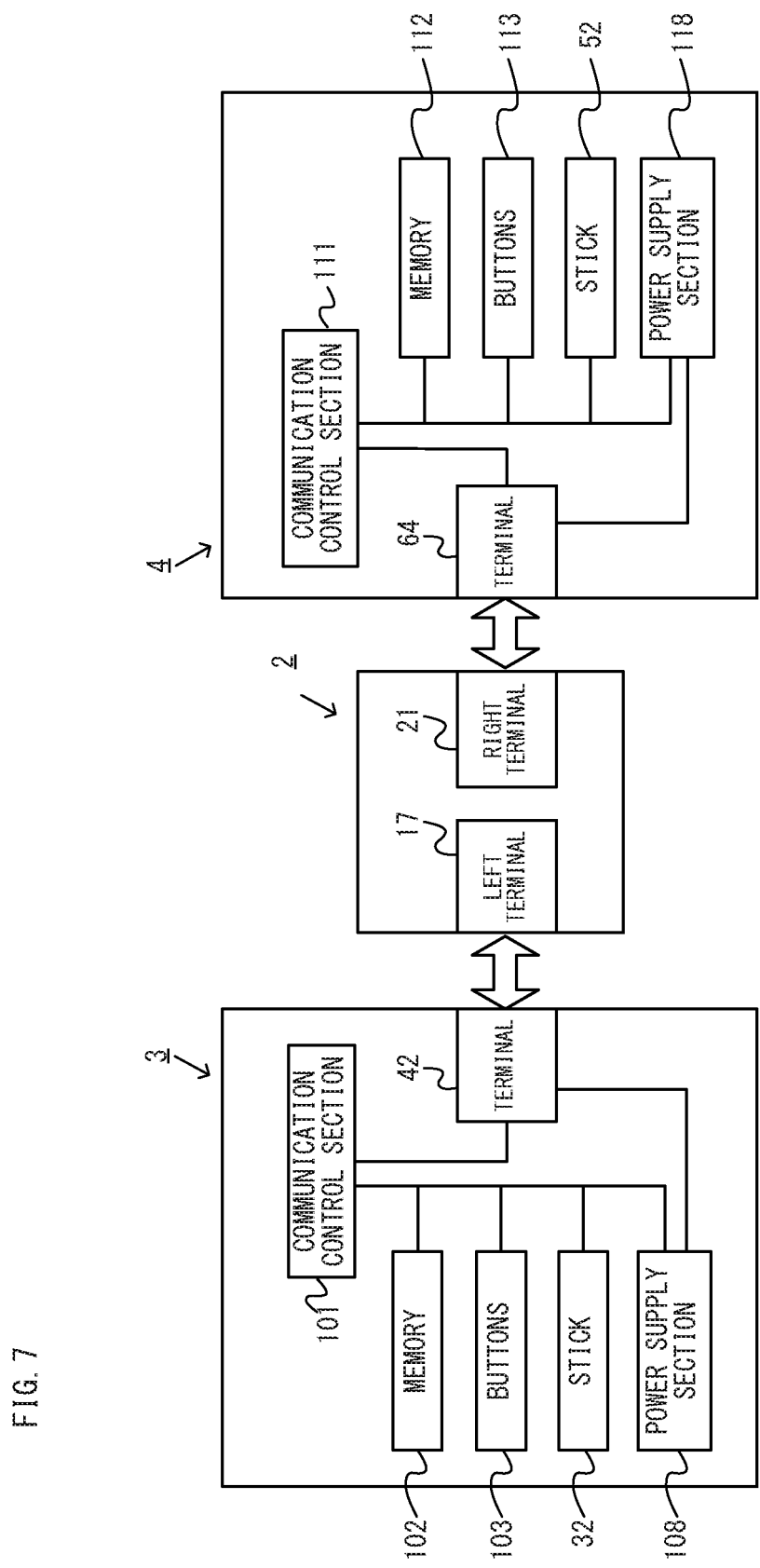
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In this embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example.

Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined time period. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In this embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Figure 8:
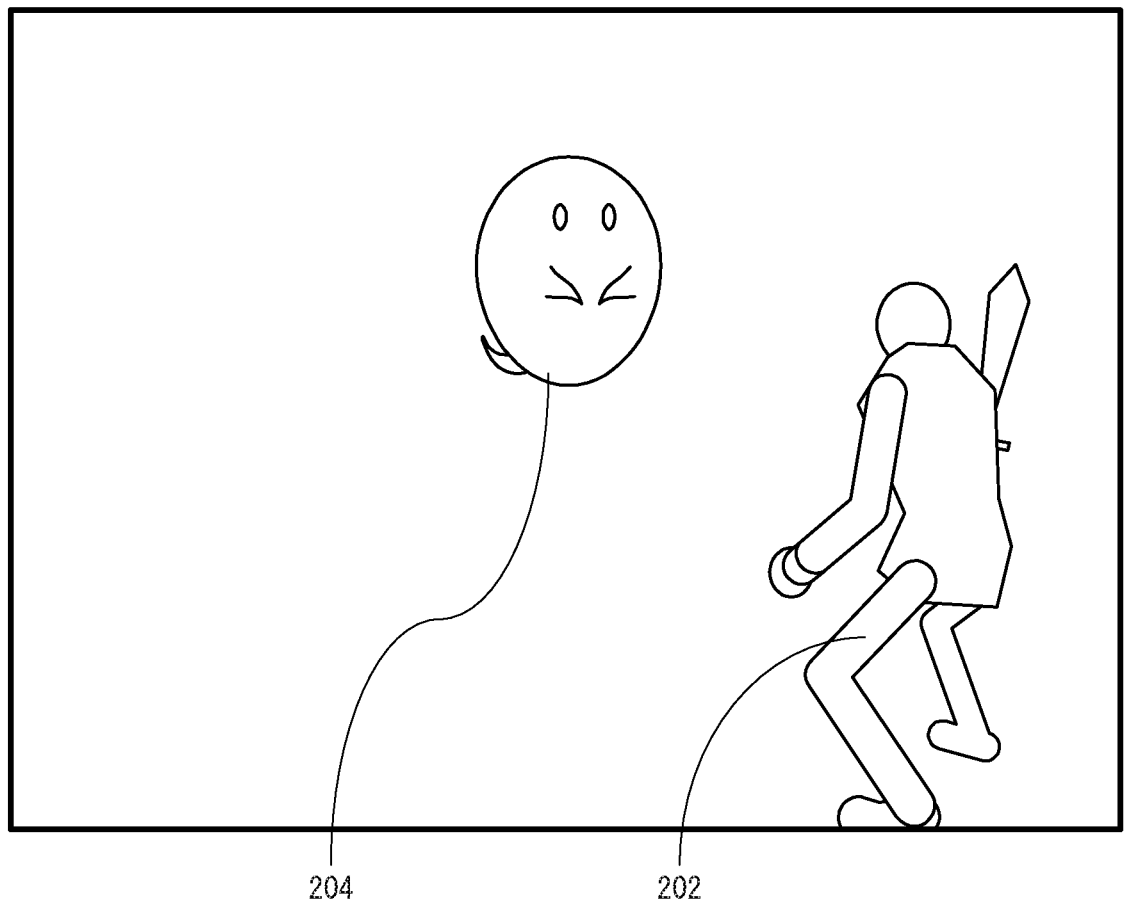
FIG. 8 is an illustration view showing a non-limiting example game image in a first operation mode.

Next, with reference to FIG. 8-FIG. 16, an outline of game processing of a virtual game executed in the game system 1 of this embodiment will be described. FIG. 8 is an illustration view showing a non-limiting first example game image displayed on a display (for example, the display 12) when a virtual game application according to this embodiment is executed.

As shown in FIG. 8, a game screen 200 as a game image of a first embodiment includes a player character 202 and an enemy character 204.

However, the player character 202 is a character or object that execution of arbitrary action is controlled based on an operation of a player. The action of the player character 202 corresponds to moving, acquiring an item, attacking the enemy character 204, defending attack of the enemy character 204, etc.

Moreover, each of a plurality of non-player characters including the enemy character 204 is a character or object that action thereof is controlled by a computer (the processor 81 of FIG. 6) rather than by an operation of the player. The action of the non-player character corresponds to moving, attacking the player character 202, defending attack of the player character 202, etc.

Although illustration is omitted, the game image includes a background object(s). In this embodiment, the background object means mainly a terrain object arranged in the virtual space. Moreover, in this embodiment, the terrain means the ground (including roads, plazas, etc.), floors, trees, grass, flowers, buildings, stairs, caves, cliffs, walls, etc.

The main body apparatus 2 functions also as an image processing apparatus, and generates and outputs (displays) display image data corresponding to various kinds of screens such as the game screen 200. The processor 81 arranges various kinds of objects and characters into the three-dimensional virtual space, whereby a certain sight or scene can be generated. An image that this scene is imaged by a virtual camera (viewed from a viewpoint) is displayed on the display 12 as a game image.

In this embodiment, the player makes the player character 202 move in the virtual space by operating the analog stick 32, and attack the enemy character 204 by depressing (operating) the ZR-button 61. A plurality of types of techniques for the player character 202 to attack the enemy character 204 are prepared. Each time the ZR-button 61 is depressed, the techniques are selected in a predetermined order. In addition, the technique may be selected at random, and the type of the technique may be selected by the player. Moreover, the technique may include a continuous technique or combo that attacks the enemy character 204 in succession.

Thus, a state where one character that can be operated by the player (in this embodiment, the player character 202) is made to appear in the virtual space and only this character is operated is referred to as a first operation mode.

In this first operation mode, a virtual camera can also be moved by tilting the analog stick 52. For example, the virtual camera can change its direction according to an operation of the player. At this time, a gazing point of the virtual camera is set to a predetermined point of the player character 202 (for example, a center of the head of the player character 202), and the virtual camera is moved so as to turn to the gazing point. Moreover, the virtual camera is moved in a state where a distance with the player character 202 is maintained at a predetermined distance d.

Moreover, in the first operation mode, the virtual camera is arranged at a position that is behind the player character 202 by the predetermined distance d and above an arranging plane of the player character 202 (for example, the ground) by a predetermined height h, and an imaging direction thereof is set to a direction of the gazing point, thereby to follow the player character 202.

Moreover, even if the virtual camera is moved according to an operation of the player, it is possible to reset, by depressing the analog stick 52, the virtual camera to predetermined arrangement with respect to the player character 202. Moreover, there is a case where the position and the imaging direction of the virtual camera may be controlled so as to forcibly image another character. For example, it may correspond to a case where an animation that a predetermined enemy character 204 such as a boss character appears in the virtual space is reproduced, or a case where an animation that the predetermined enemy character 204 falls (loses a battle) is reproduced, or the like.

Moreover, if the player depresses the ZL-button 39 in the first operation mode, the operation mode will be shifted to the second operation mode. In this embodiment, the second operation mode means a state where another character 210 that can be operated by the player (hereinafter, called "sub-character") appears in the virtual space in addition to the player character 202 and the sub-character 210 is automatically controlled by the processor 81 when no operation by the player is applied to the sub-character 210. In this embodiment, and the sub-character 210 appears into the virtual space so as to jump out from the player character 202 at a time of shifting to the second operation mode from the first operation mode. A direction of jumping is a direction of the imaging direction of the virtual camera or a direction parallel to the imaging direction. However, this is an example, and the direction that the sub-character 210 jumps out may be decided according to a direction of the player character 202. These are the same for a moving direction when the sub-character 210 moves so as to jump out.

However, in the second operation mode, the player character 202 and the virtual camera can be operated by the player, as similar to the first operation mode. Duplicate description on the operation of the player character 202 and the virtual camera is omitted here. In the second operation mode, the player character 202 and the sub-character 210 are controlled so as to be settled in a field angle of the virtual camera. In this case, the gazing point of the virtual camera is set to the predetermined point of the player character 202, as mentioned above.

Figure 9:
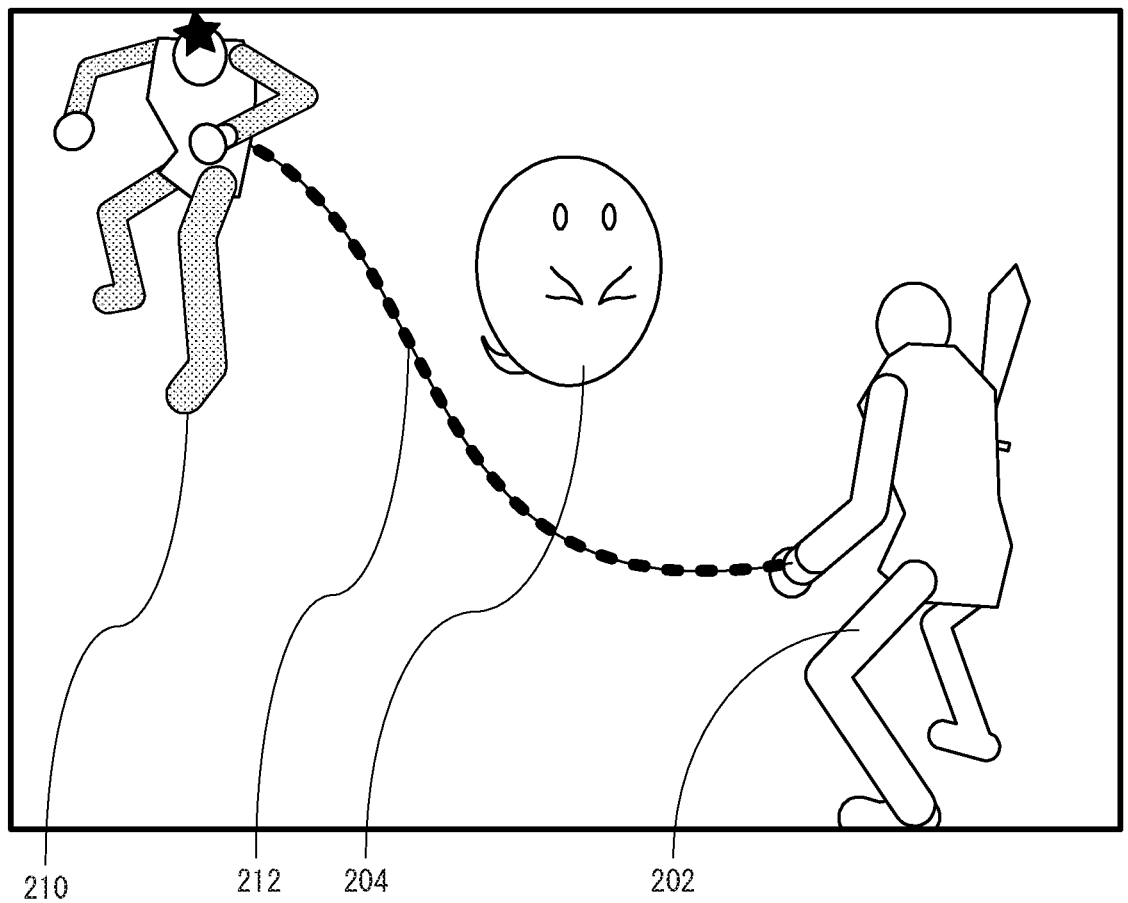
FIG. 9 is an illustration view showing a non-limiting example game image in a second operation mode.

FIG. 9 is an illustration view showing a non-limiting example game screen 200 corresponding to a game image in the second operation mode. The sub-character 210 and a connection object 212 are included in the game screen 200 shown in FIG. 9 in addition to the player character 202 and the enemy character 204. The player character 202 and the sub-character 210 are connected by the connection object 212. For example, one end of the connection object 212 is connected to a body of the sub-character 210 and the other end of the connection object 212 is held by the player character 202, or is fixed to an arm (or a part) of the player character 202. Therefore, a movable range of the sub-character 210 is restricted or decided by length of the connection object 212. However, the length (the maximum length) of the connection object 212 is set in advance. Moreover, although action of the sub-character 210 is automatically controlled basically, it is settable that each time the ZL-button 39 is depressed, the sub-character 210 is made to be moved so as to jump out or move farer (or be separated) by a predetermined distance, or move closer by a predetermined distance when the enemy character 204 does not appear in the virtual space or when the enemy character 204 does not exist in the movable range of the sub-character 210. At this time, the length of the connection object 212 is lengthened by predetermined length, or shortened by predetermined length.

As mentioned above, the action of the sub-character 210 is automatically controlled basically in the second operation mode. When the enemy character 204 appears in the virtual space, the sub-character 210 attacks the enemy character 204 automatically. In this case, the action of the sub-character 210 is controlled by the computer (processor 81). However, when two or more enemy characters 204 appear, the action of the sub-character 210 is controlled so as to attack any one of the enemy characters 204, for example, the enemy character 204 existing most close. The enemy character 204 that can be attacked by the sub-character 210 is an enemy character 204 that exists in the movable range of the sub-character 210. In the following, the same applies when the sub-character 210 attacks the enemy character 204.

Moreover, in the second operation mode, it is possible to make the sub-character 210 attack the enemy character 204 by operating the ZL-button 39 in addition to the above-mentioned automatic attack. In such a case, an attack motion by means of the automatic control by the processor 81 is interrupted, and an attack motion according to the operation by the player is performed. Moreover, when the player operates the ZL-button 39 at just timing, the sub-character 210 attacks the enemy character 204 so as to apply a damage effectively (larger). For example, when the player character 202 attacks the enemy character 204 with a continuous technique or combo, if the ZL-button 39 is depressed at a timing following the continuous technique, the sub-character 210 attacks the enemy character 204 with a technique capable of applying a more serious damage in succession to the continuous technique.

However, a physical strength value is assigned to the sub-character 210, and if the physical strength value becomes 0 (zero), the sub-character 210 is erased (or not displayed), whereby being shifted to the first operation mode. At this time, if the physical strength value becomes 0 (zero), it becomes impossible for the sub-character 210 to put out a technique even if the ZL-button 39 is depressed timely to the continuous technique by the player character 202.

In this embodiment, the physical strength value of the sub-character 210 is set at a maximum value (in this embodiment, "100") at a time of start of the game, and if the sub-character 210 appears in the virtual space, the physical strength value is decreased by a first predetermined quantity (0.05, for example) for every first predetermined time (for example, one frame). In this embodiment, one frame is a unit time for screen update, for example, ⅟60 seconds. However, if the sub-character 210 is erased, that is, if shifted to the first operation mode, in this first operation mode, the physical strength value is increased by a second predetermined quantity (0.05, for example) for every second predetermined time (for example, one frame).

In addition, although the first predetermined time and the second predetermined time are set as the same time period in this embodiment, these may be set to different values. Similarly, the first predetermined quantity (decreasing speed) and the second predetermined quantity (increasing speed) may be set to different values.

Thus, the physical strength value is set to the sub-character 210, and since use of the sub-character 210 is restricted by the physical strength value, it is necessary to play the game with a strategy for properly using a case of using the sub-character 201 or a case of not using. For example, when the sub-character 210 is attacking the enemy character 204 by the automatic control, the player can operate the player character 202 to further attack the enemy character 204. That is, it is possible to apply a lot of damage to the enemy character 204 or to back up the sub-character 210. Therefore, as an example of the strategy, it may be considered that the sub-character 210 is used in a scene that a strong enemy exists or a plurality of enemies exist, a scene that the physical strength value is sufficient and a battle seems to finish immediately, etc., or that the sub-character 210 is not used whereby recovering the physical strength of the sub-character 210 in a scene that seems to require only the player character 202, a scene that a strong enemy waits next, a scene with few physical strength values, etc.

In this embodiment, if the R-button 60 is depressed when the sub-character 210 appears in the virtual space, the sub-character 210 is erased from the virtual space. Then, the operation mode is shifted to the first operation mode from the second operation mode. That is, it is also possible to erase the sub-character 210 by the operation of the player.

As mentioned above, since it is necessary to consider the strategy that properly uses or does not use the sub-character 210 based on the physical strength value of the player character 202, the physical strength value of the sub-character 210 may be displayed in the game screen 200. For example, it is conceivable to display a remaining amount of the physical strength value as a numerical value, or display a remaining amount of the physical strength value as a pie chart or a bar graph.

Moreover, in this embodiment, if the physical strength value becomes 0 (zero), the sub-character 210 is erased automatically. In this case, it cannot make the sub-character 210 appear until the physical strength value becomes the maximum value of 100. However, when the sub-character 210 is erased by the operation of the player in a state where the physical strength value is larger than 0 (zero), even if the physical strength value does not become 100, it is possible to make the sub-character 210 re-appear by an operation of the player.

Furthermore, if the player continues to depress the ZL-button 39 in the second operation mode (in this embodiment, long-depression of 3 seconds), the operation mode is shifted to the third operation mode, and the third operation mode is maintained only during time the ZL-button 39 is kept depressed. Therefore, if depression of the ZL-button 39 is canceled, shifting to the second operation mode from the third operation mode is performed. However, when the R-button 60 is depressed in the third operation mode, the sub-character 210 is erased from the virtual space, and the operation mode is shifted to the first operation mode from the third operation mode.

In this embodiment, the third operation mode means a state where it is individually operable movement of the player character 202 and the sub-character 210. The movement of the player character 202 is operated using the analog stick 32 similar to the first operation mode or the second operation mode. The movement of the sub-character 210 is operated using the analog stick 52. Therefore, in the third operation mode, the virtual camera cannot be operated with the analog stick 52, but automatically controlled. At this time, it is controlled so that the player character 202 and the sub-character 210 are both included in the field of view of the virtual camera.

Moreover, in the third operation mode, when the ZR-button 61 is depressed, the length of the connection object 212 is shortened by predetermined length. Accordingly, the player character 202 is moved so as to approach the sub-character 210 by predetermined length. At this time, the player character 202 is moved while floating in the virtual space. Therefore, the player character 202 can move while jumping over a place that the player character 202 cannot be usually moved (or passed), such as a dangerous place and a place without ground (or floor). For example, by depressing the ZL-button 39 in the second operation mode, the sub-character 210 is made to be moved so as to jump out, and then, by shifting to the third operation mode by performing the long depression of the ZL-button 39, if the ZR-button 61 is depressed, the connection object 212 is shortened by the predetermined length, and therefore, the player character 202 is moved while floating in the air as mentioned above.

FIG. 10-FIG. 13 are illustration views showing non-limiting example game screens 200 corresponding to a game image of a scene performing action to restrain the enemy character 204 in the third operation mode. In FIG. 10-FIG. 13, in order to simplify, views that the player makes only the sub-character 210 move and the player character 202 stay at that place are illustrated, but of course, both may be made to be moved through an operation.

Figure 10:
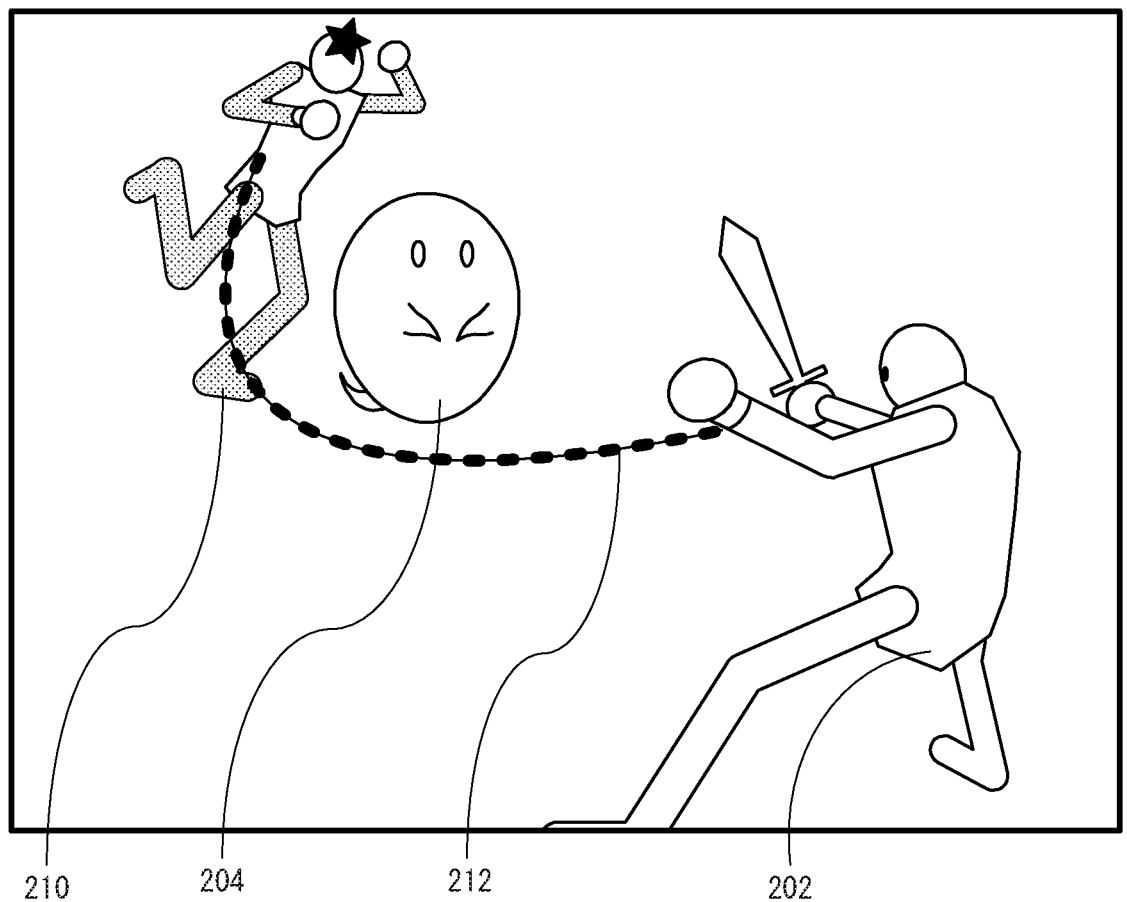
FIG. 10 is an illustration view showing a non-limiting first example game image in a third operation mode.

In FIG. 10, the game screen 200 of a manner that the sub-character 210 is moved in a right direction from a left side of the game screen 200, thereby to come around behind the enemy character 204 is displayed. Moreover, in FIG. 10, the connection object 212 starts to be moved or/and deformed so as to wind around the enemy character 204 according to movement of the sub-character 210.

Figure 11:
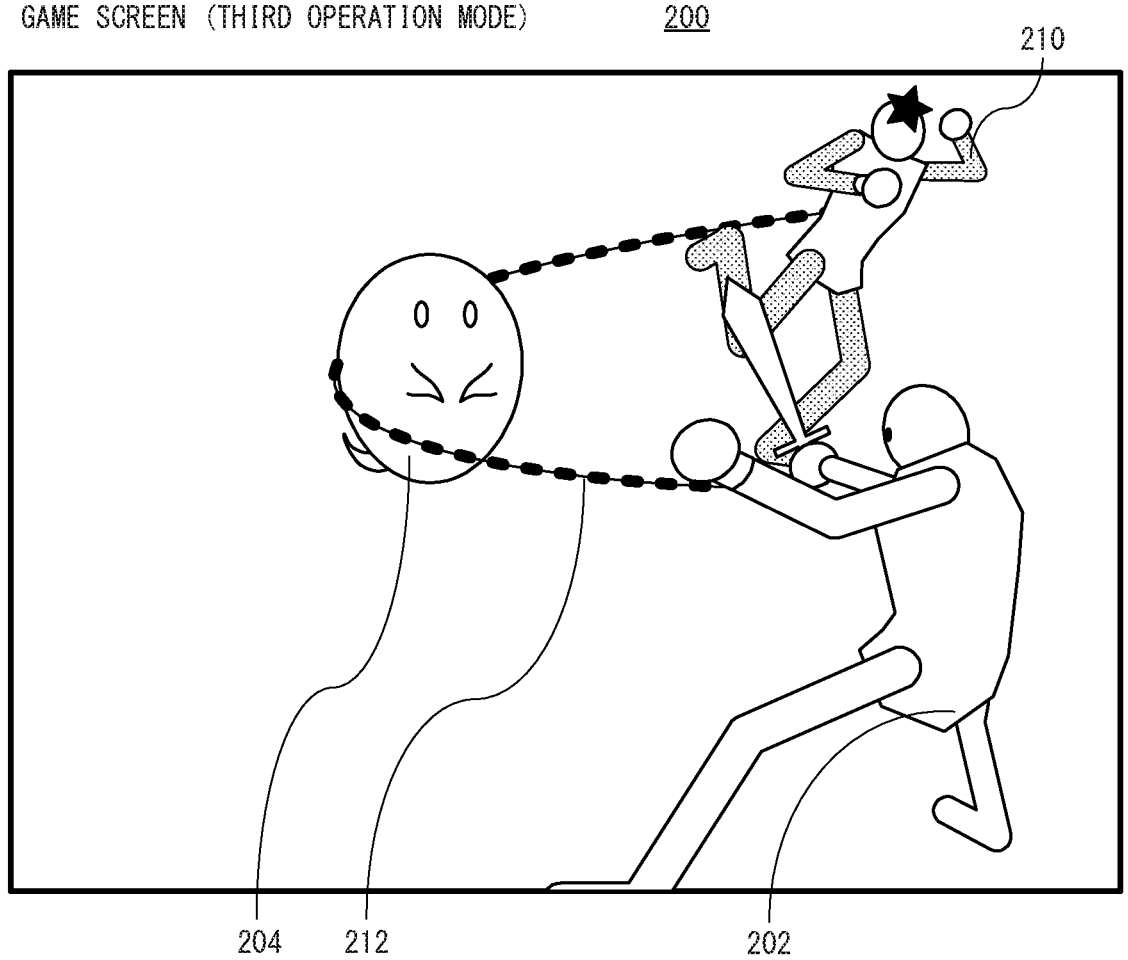
FIG. 11 is an illustration view showing a non-limiting second example game image in the third operation mode.

In FIG. 11, the player character 202 stays at that place, and the sub-character 210 is further moved in the right direction from the position shown in FIG. 10, and has arrived at a right side of the game screen 200. Moreover, in FIG. 11, the connection object 212 is further moved or/and deformed according to movement of the sub-character 210, and a part thereof is caught in the enemy character 204.

Figure 12:
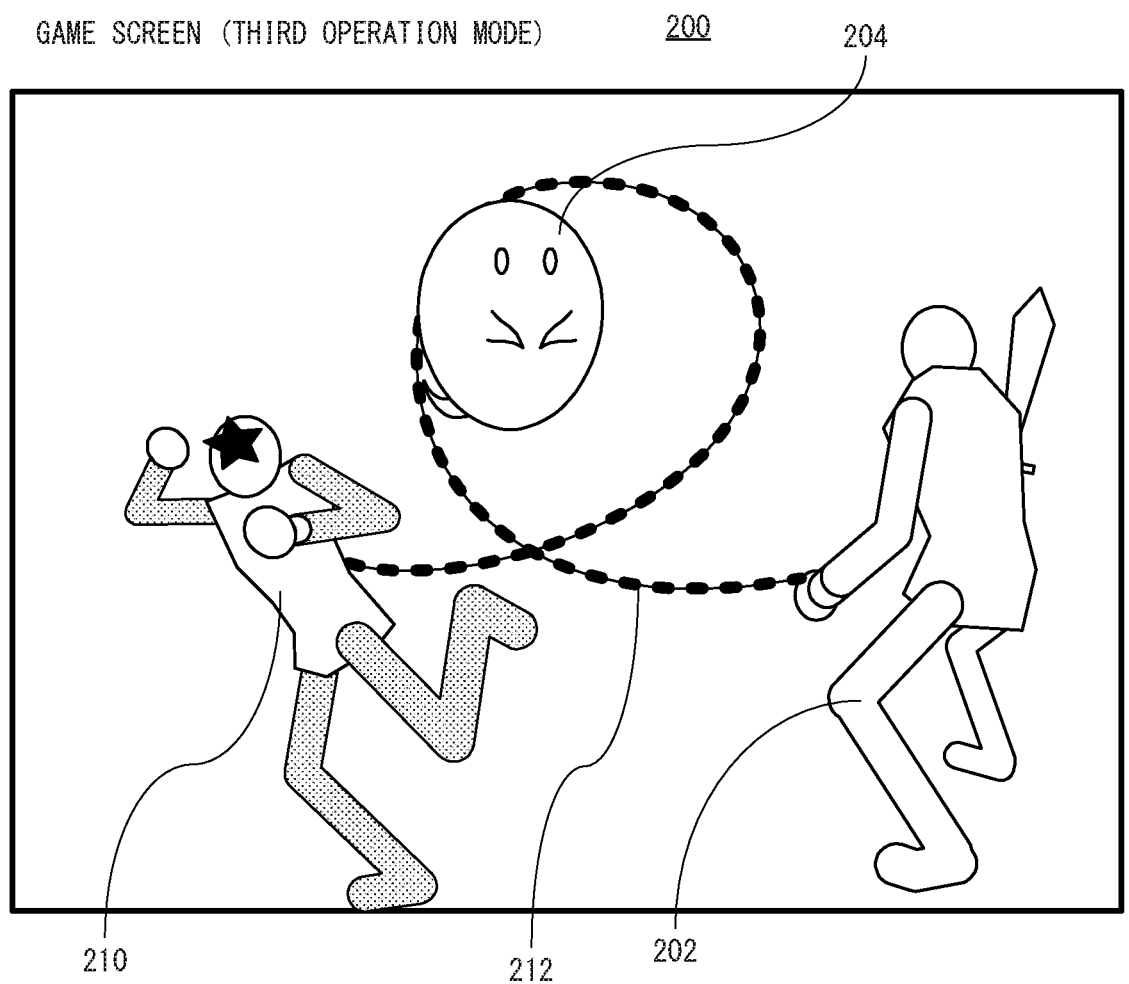
FIG. 12 is an illustration view showing a non-limiting third example game image in the third operation mode.

In FIG. 12, the sub-character 210 is moved from the position shown in FIG. 11 to the left of the game screen 200 through between the player character 202 and the enemy characters 204, and has arrived at a left side of the game screen 200. Moreover, in FIG. 12, the connection object 212 is further moved or/and deformed according to the movement of the sub-character 210, and surrounds the enemy character 204.

Figure 13:
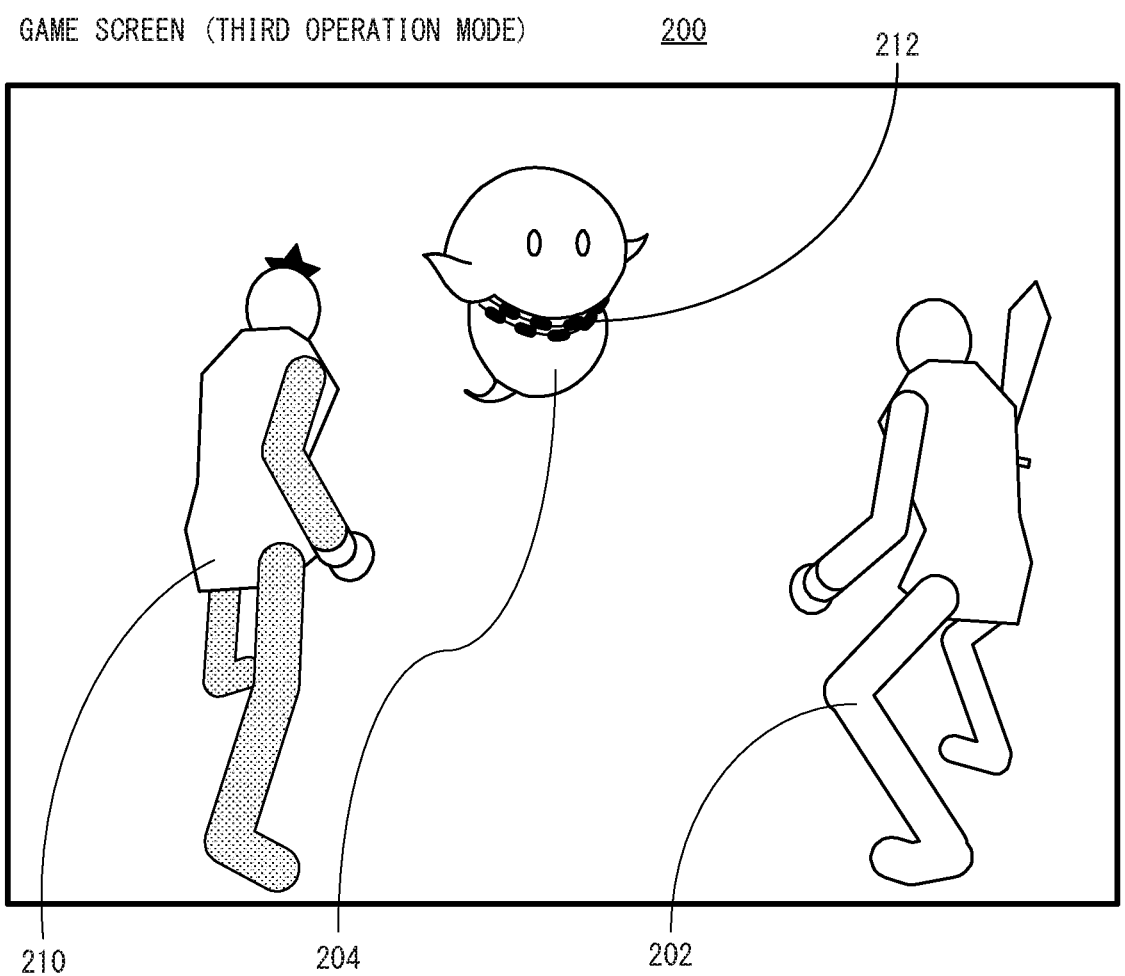
FIG. 13 is an illustration view showing a non-limiting fourth example game image in the third operation mode.

If the enemy character 204 is surrounded by the connection object 212 as shown in FIG. 12, then, the player character 202 and the sub-character 210 perform automatically action that the enemy character 204 is bound by the connection object 212, and as shown in FIG. 13, the connection object 212 is deformed into a state of coiling around the enemy character 204. At this time, the player character 202 and the sub-character 210 become a state where they are temporarily not connected by the connection object 212, but are immediately connected by a new connection object 212.

In this embodiment, the connection object 212 can give a damage only by contacting the enemy character 204. For example, since a current flows or heat is generated in the connection object 212, the enemy character 204 is damaged by the current or heat. Therefore, in case of a weak enemy character 204, it may be possible to defeat the enemy character only by being bound with the connection object 212. On the other hand, in case of a strong enemy character 204, if brought into a state of being bound with the connection object 212, it is possible to block motion of the enemy character 204. Therefore, in case of the strong enemy character 204, the player can make the player character 202 or/and the sub-character 210 attack the enemy character 204 that the motion is being blocked after shifting the operation mode to the second operation mode by cancelling the depression of the ZL-button 39. However, after shifting the operation mode to the first operation mode by depressing the R-button 60, the player character 202 may be operated to attack the enemy character 204 that the motion is being blocked.

In addition, since the maximum length of the connection object 212 is set in advance as mentioned above, in case of a comparatively large enemy character 204, by binding a plurality of parts such as a hand or/and leg with the connection object 212, respectively, it is possible to defeat the enemy character 204, or block the motion of the enemy character 204.

Moreover, although an example that the player character 202 is allowed to stay in that place in FIG. 10-FIG. 13, it is needless to say that the enemy character 204 may be bound by the connection object 212 by staying the sub-character 210 in that place and moving the player character 202 or the enemy character 204 may be bound by the connection object 212 by moving both the player character 202 and the sub-character 210 around the enemy character 204 in opposite directions, respectively.

Figure 14:
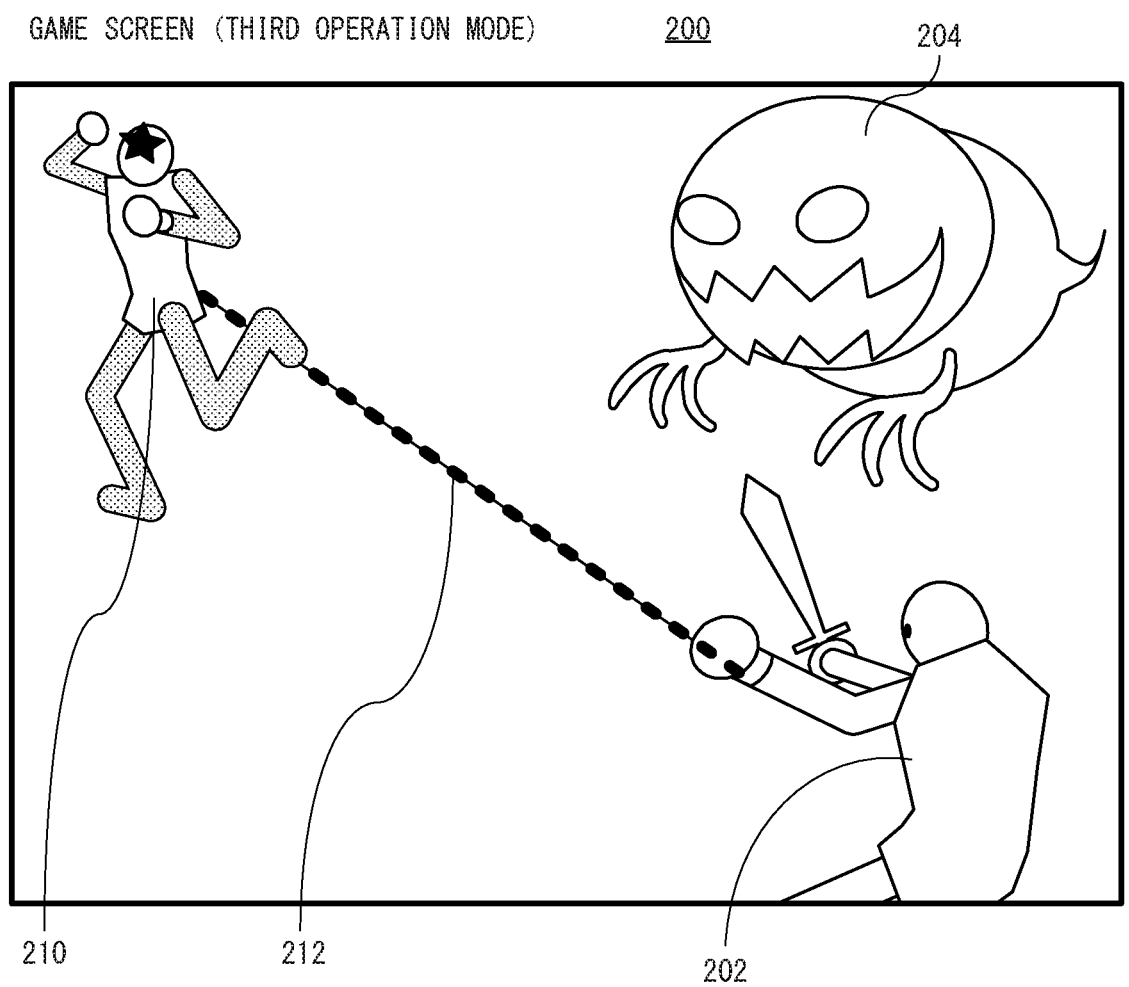
FIG. 14 is an illustration view showing a non-limiting fifth example game image in the third operation mode.
Figure 15:
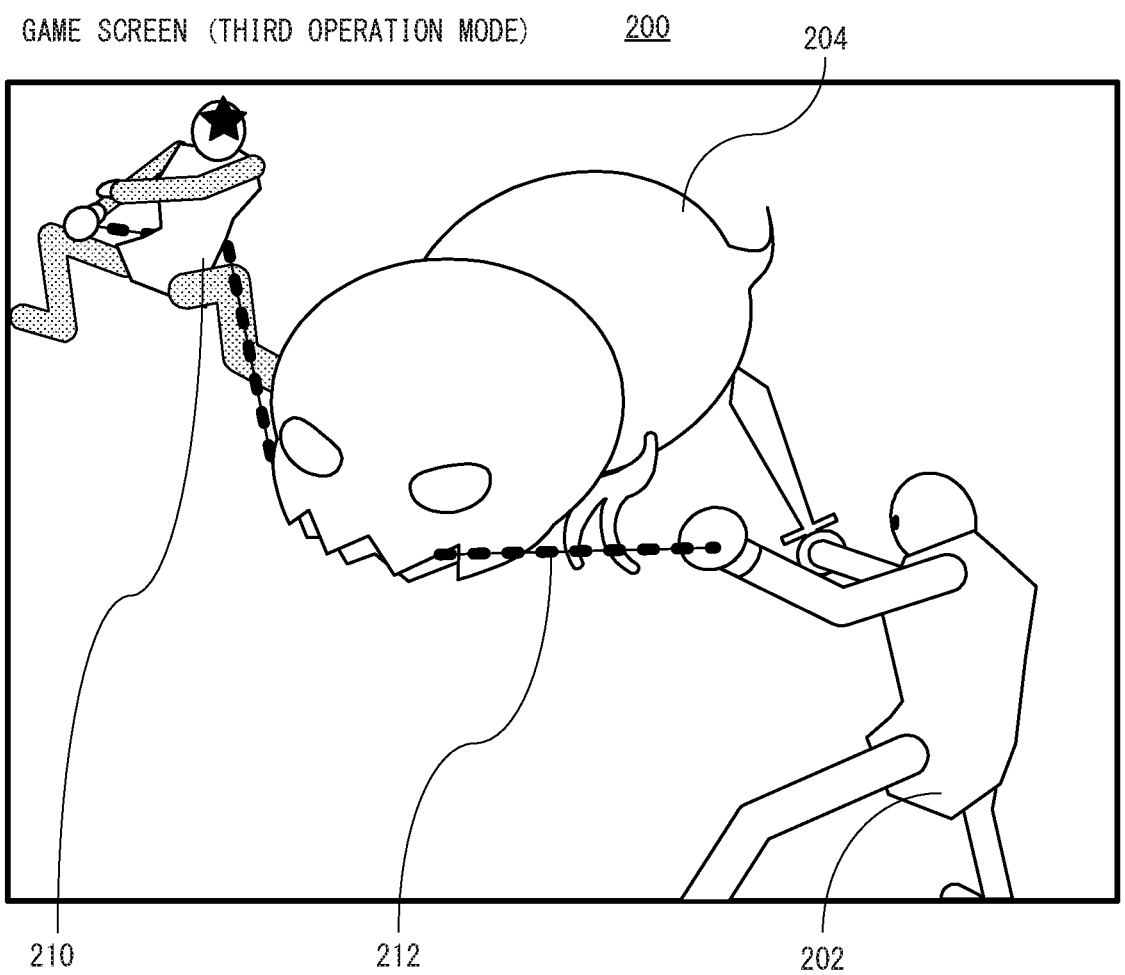
FIG. 15 is an illustration view showing a non-limiting sixth example game image in the third operation mode.
Figure 16:
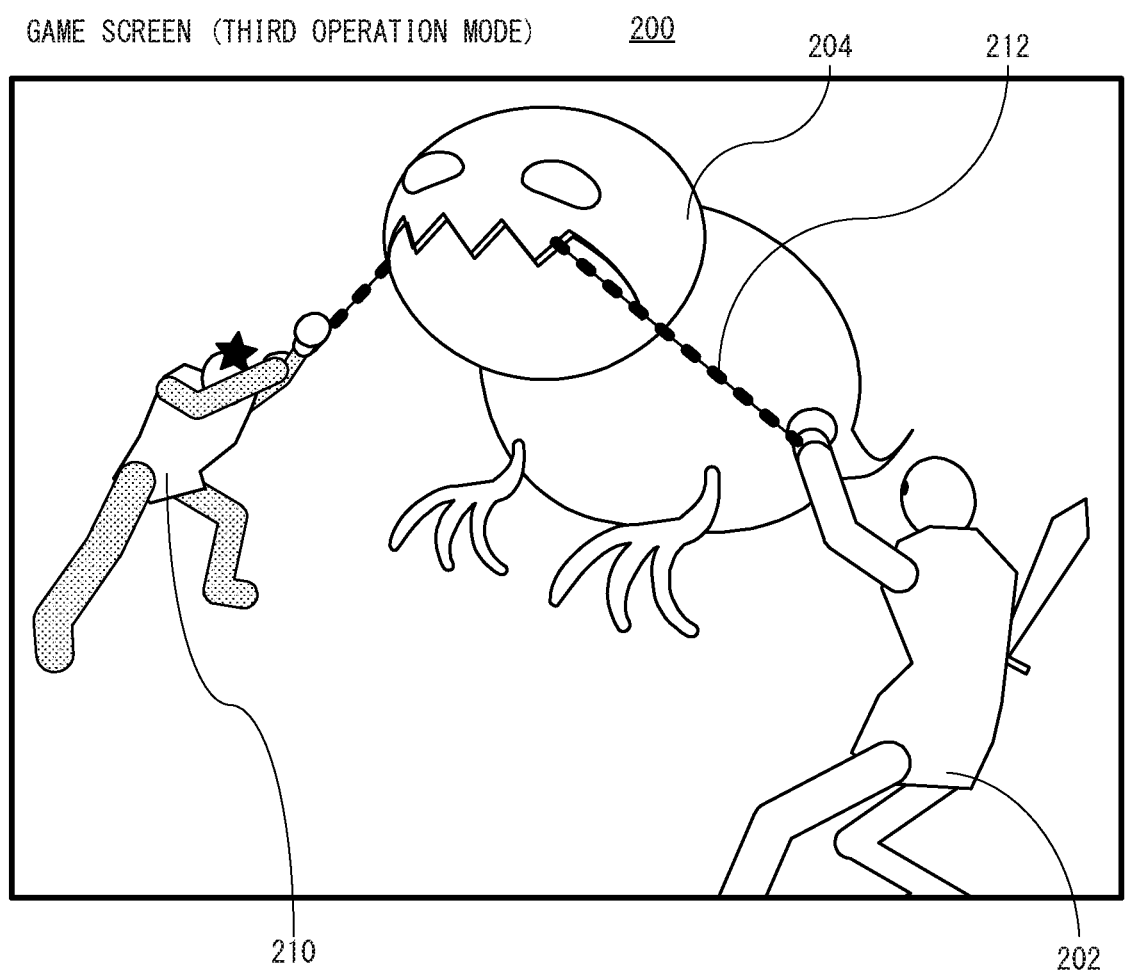
FIG. 16 is an illustration view showing a non-limiting seventh example game image in the third operation mode.

FIG. 14-FIG. 16 are illustration views showing non-limiting example game screens 200 corresponding to a game image of a scene that performing action of hooking the connection object on the enemy character 204 in the third operation mode.

In FIG. 14, the game screen 200 is displayed, in which the player character 202 is in a state stationary on a lower right side of the game screen 200 and the sub-character 210 is in a state stationary on an upper left side of the game screen 200, and the connection object 212 is stretched between the player character 202 and the sub-character 210. Moreover, the enemy character 204 larger than the player character 202 and the sub-character 210 is beginning to move to the lower left from an upper right side of the game screen 200. At this time, the player character 202 and the sub-character 210 may not be stationary, and the connection object 212 may be stretched while making the both characters move in opposite direction, for example.

In FIG. 15, the game screen 200 is displayed, in which the enemy character 204 moves to the lower left from a state shown in FIG. 14, with taking the connection object 212 in its mouth. That is, a moment that the enemy character 204 is caught in the connection object 212 is shown.

In FIG. 16, the game screen 200 is displayed, in which the enemy character 204 raises the head from a state shown in FIG. 15. That is, the enemy character 204 is in a state where it is still caught in the connection object 212.

Since the connection object 212 can give a damage to the enemy character 204 as mentioned above, it is possible to defeat the enemy character 204 by hooking the connection object 212 on the enemy character 204. However, in case of a strong enemy character 204, by hooking the connection object 212, and thereafter, by performing predetermined action such as throwing off to apply damage to the strong enemy character 204, it is possible to block the motion of the enemy character 204 some extent. Then, after shifting the operation mode to the second operation mode by cancelling the depression of the ZL-button 39, the player operates the player character 202 or/and the sub-character 210 to attack the enemy character 204 that the motion is being blocked. Alternately, after shifting the operation mode to the first operation mode by depressing the R-button 60, the player operates the player character 202 to attack the enemy character 204 that the motion is being blocked.

That is, in the example shown in FIG. 14-FIG. 16, the player estimates motion of the enemy character 204 and controls the movement of the player character 202 and the sub-character 210 so as to set the connection object 212, and hooks the enemy character 204 on this connection object 212.

Thus, in the third operation mode, by individually moving the player character 202 or/and the sub-character 210, thereby making the connection object 212 be moved or/and deformed so as to bind the enemy character 204 with the connection object 212 or hook the connection object 212 on the enemy character 204, it is possible to give a damage to the enemy character 204 from the connection object 212.

In addition, in this embodiment, although only the movement is controlled by operating the player character 202 or/and the sub-character 210 in the third operation mode, the enemy character 204 may be attacked by operating the operation button except the operation concerning with switching of the operation mode and the movement of the characters. Alternately, by providing an inertia sensor such as an acceleration sensor or/and a gyro sensor on the main body apparatus 2, the left controller 3 or the right controller 4, the enemy character 204 may be attacked based on an output of the inertia sensor. For example, in a case where the main body apparatus 2 is attached with the left controller 3 and the right controller 4, based on the output of the inertia sensor provided in the main body apparatus 2, the left controller 3 or the right controller 4, attack according to a posture or/and motion of the game system 1 is performed. Moreover, in a case where the main body apparatus 2 is not attached with the left controller 3 and the right controller 4, based on the output of the inertia sensor provided in the left controller 3 or/and the right controller 4, attack according to a posture or/and motion of the left controller 3 or/and the right controller 4 is performed. These are the same also in the first operation mode and the second operation mode.

Moreover, in this embodiment, three operation modes are settable, and the player controls only the motion of the player character 202 according to an operation (i.e., manual operation) of the player in the first operation mode, except depression of the ZL-button 39, the sub-character 210 attacks the enemy character 204 with the automatic control in the second operation mode, and controls the movement of both the player character 202 and the sub-character 210 according to the operation of the player in the third operation mode. Therefore, as to the complexity of the operation, the first operation mode is simplest and the third operation mode is most complicated.

That is, when making the sub-character 210 appear or disappear by switching the operation mode, it is possible to select whether the sub-character 210 is to be controlled by an automatic operation or a manual operation when making the sub-character 210 appear. That is, there are many variations of the operation, but if feeling that the operation is difficult or complicated, or in a scene where a powerful attack is not required, it is possible to play with a simple operation.

Figure 17:
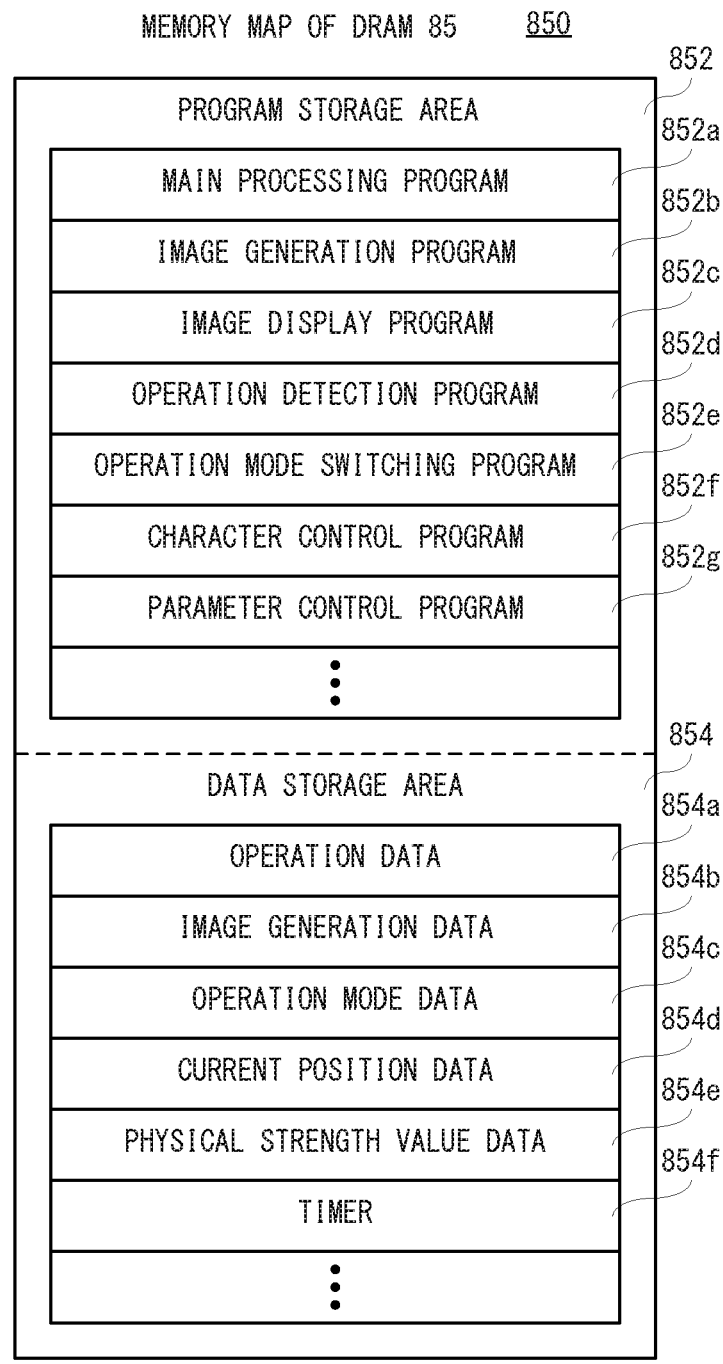
FIG. 17 is an illustration view showing a non-limiting example memory map of a DRAM of the main body apparatus shown in FIG. 6.

FIG. 17 is a view showing a non-limiting example memory map 850 of the DRAM 85 shown in FIG. 6. As shown in FIG. 17, the DRAM 85 includes a program storage area 852 and a data storage area 854. The program storage area 852 is stored with a program of a game application (i.e., game program). As shown in FIG. 17, the game program includes a main processing program 852a, an image generation program 852b, an operation detection program 852d, an operation mode switching program 852e, a character control program 852f, a parameter control programs 8552g, etc. However, a function of displaying images such as a game image is a function that the main body apparatus 2 is provided with. Therefore, the image display program 852c is not included in the game program.

Although detailed description is omitted, at a proper timing after the power of the main body apparatus 2 is turned on, a part or all of each of the programs 852a-852g is read from the flash memory 84 or/and a storage medium attached to the slot 23 so as to be stored in the DRAM 85. However, a part or all of each of the programs 852a-852g may be acquired from other computers capable of performing communication with the main body apparatus 2.

The main processing program 852a is a program for performing overall game processing of a virtual game of this embodiment. The image generation program 852b is a program for generating, using image generation data 854b, display image data corresponding to various kinds of images such as a game image. The image display program 852c is a program for outputting to a display the display image data generated according to the image generation program 852b. Therefore, the images (that is, the game screen 200, etc.) corresponding to the display image data are displayed on the display such as the display 12.

The operation detection program 852d is a program for acquiring the operation data 854a from the left controller 3 or/and the right controller 4. The operation mode switching program 852e is a program for switching the operation mode based on an operation of the player or a numerical value of a parameter (in this embodiment, physical strength value) among the first operation mode, the second operation mode and the third operation mode. Although the operation mode cannot be switched from the first operation mode to the third operation mode directly in this embodiment, the operation mode may be switched directly to the third operation mode from the first operation mode by operating a predetermined operation button.

The character control program 852$f$ is a program for controlling the motion of the player character 202 or/and the sub-character 210 based on an operation of the player, or controlling the motion of the non-player character including the enemy character 204 irrespective of an operation of the player. Moreover, the character control program 852$f$ is also a program for making the sub-character 210 appear in the virtual space or disappear from the virtual space according to an operation of the player or the physical strength value.

The parameter control program 852$g$ is a program for increasing or decreasing (i.e., controlling) a numerical value of the parameter between a maximum value (in this embodiment, 100) and a minimum value (in this embodiment, 0).

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, the data storage area 854 is stored with operation data 854$a$, image generation data 854$b$, operation mode data 854$c$, current position data 854$d$, physical strength value data 854$e$, etc. Moreover, the data storage area 854 is provided with a timer 854$f$, etc.

The operation data 854$a$ is operation data received from the left controller 3 or/and the right controller 4. In this embodiment, when the main body apparatus 2 receives the operation data from both the left controller 3 and the right controller 4, the main body apparatus 2 stores the operation data 854$a$ classified into the left controller 3 and the right controller 4, respectively.

The image generation data 854$b$ is data required for generating an image, such as polygon data and texture data. The operation mode data 854$c$ is data for determining the first operation mode, the second operation mode or the third operation mode, and specifically, data of identification information on a current operation mode.

The current position data 854$d$ is data about position coordinates at the current frame of the characters and the objects capable of moving in the virtual space, such as the player character 202, the enemy character 204, the sub-character 210 and the connection object 212.

The physical strength value data 854$e$ is numerical value data of the physical strength value (that is, parameter) of the sub-character 210, and as mentioned above, increased or decreased according to the parameter control program 852$g$. That is, the physical strength value represented by the physical strength value data 854$e$ indicates a remaining amount of the physical strength value at the current frame. However, the physical strength value is set as the maximum value (in this embodiment, 100) when the virtual game starts.

The timer 854$f$ is a timer or counter for counting length of time period that the player continues to depress a predetermined operation button (in this embodiment, the ZL-button 39). The timer 854$f$ starts count when the player depresses the ZL-button 39, and ends the count to be reset when the player releases (cancelling depression of) the ZL-button 39 in the second operation mode. In addition, although description is omitted, a start and end of the count of the timer 854$f$ are controlled according to the operation mode switching program 852$e$.

Although illustration is omitted, the data storage area 854 is stored with other data, and provided with flags and other timers (counters).

Figure 18:
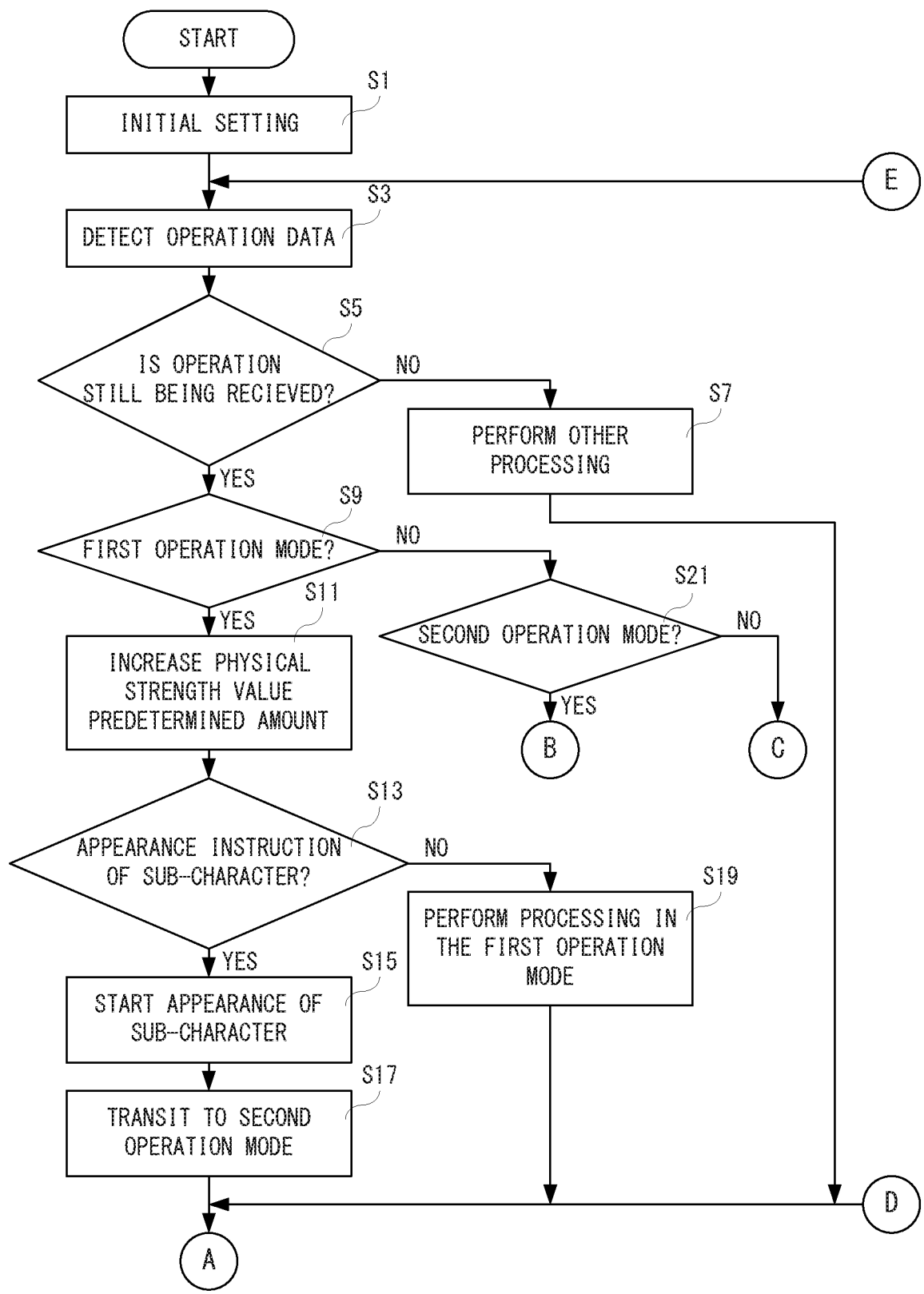
FIG. 18 is a flow chart showing a part of non-limiting example game processing of the processor of the main body apparatus shown in FIG. 6.
Figure 19:
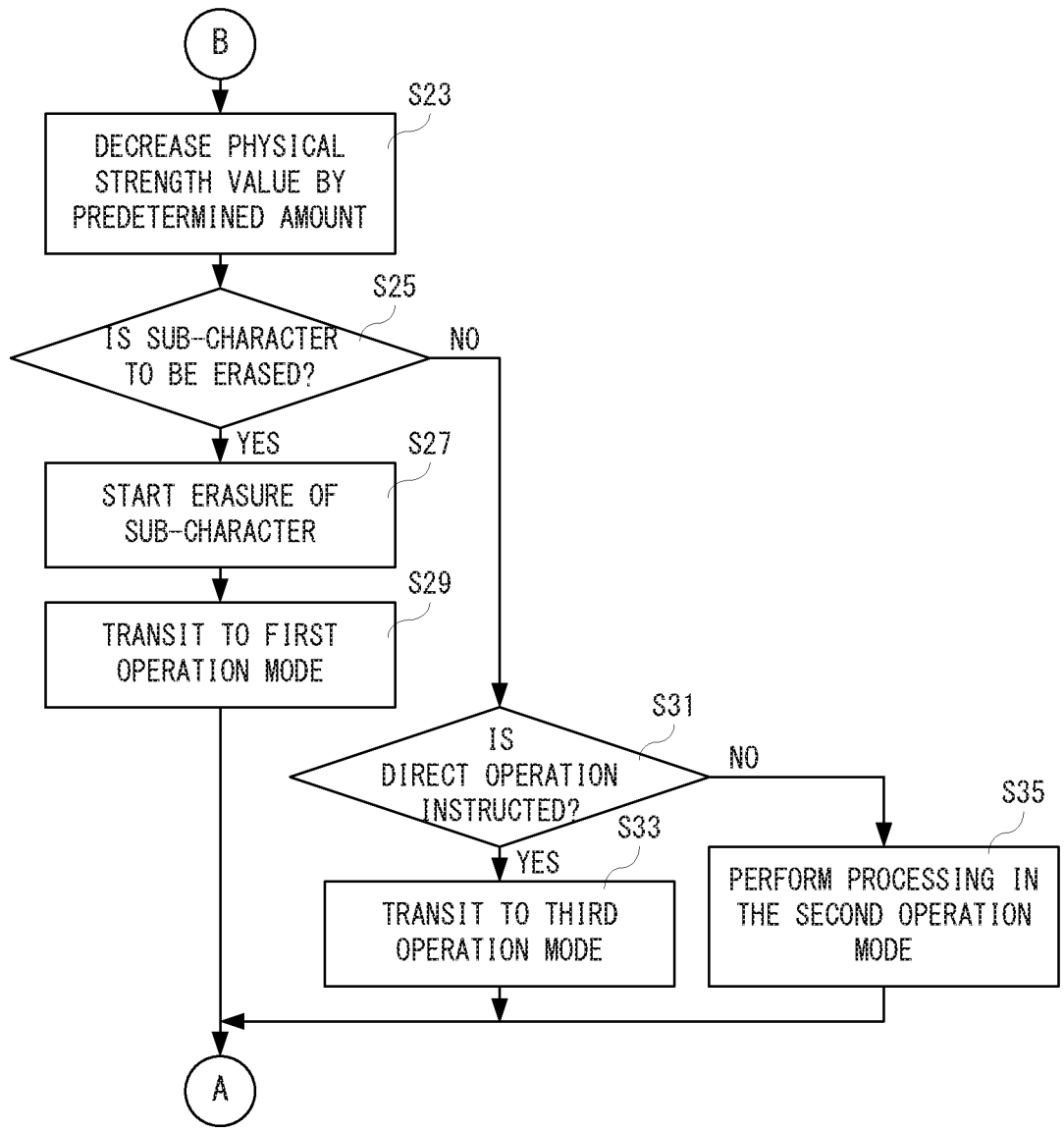
FIG. 19 is a flow chart showing another part of the non-limiting example game processing of the processor of the main body apparatus shown in FIG. 6, following FIG. 18.
Figure 20:
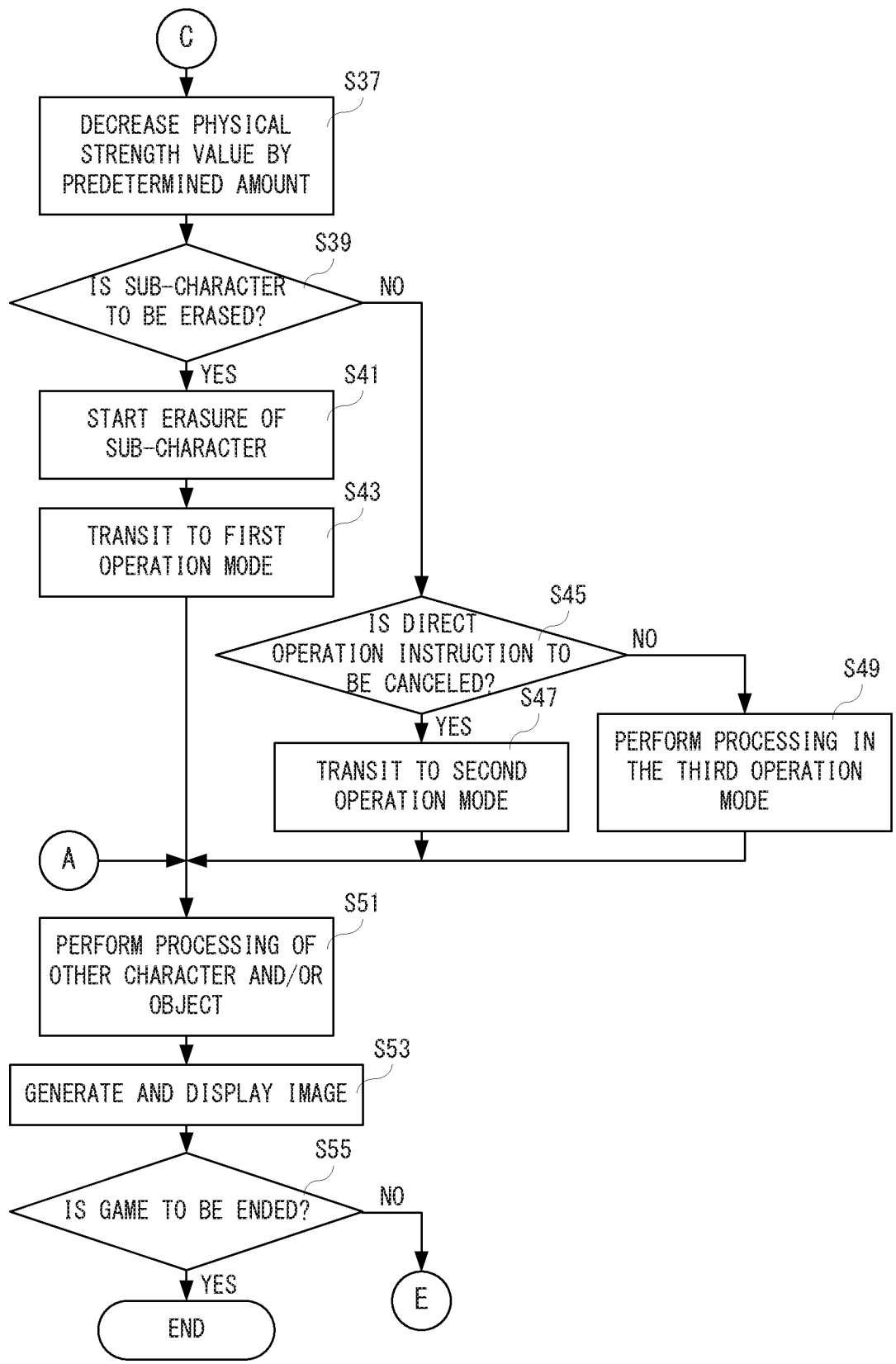
FIG. 20 is a flow chart showing the other part of the non-limiting example game processing of the processor of the main body apparatus shown in FIG. 6, following FIG. 18.

FIG. 18-FIG. 20 are flowcharts showing non-limiting example processing of the game program (game processing) by the processor 81 (or computer) of the main body apparatus 2. Although the game processing is explained using FIG. 18-FIG. 20 in the following, duplicate description for a step(s) performing the same processing will be omitted.

However, processing of respective steps of the flowcharts shown in FIG. 18-FIG. 20 are mere examples, and if the same or similar result is obtainable, an order of the respective steps may be exchanged. Moreover, in this embodiment, it will be described that the processor 81 basically performs the processing of each step of the flowcharts shown in FIG. 18-FIG. 20; however, some steps may be executed by a processor(s) or/and a dedicated circuit(s) other than the processor 81.

When a power of the main body apparatus 2 is turned on, prior to execution of the overall game processing, the processor 81 executes a boot program stored in a boot ROM not shown, whereby respective units including the DRAM 85, etc. are initialized. The main body apparatus 2 starts the game processing when the execution of the game program the game program of this embodiment is instructed by the user.

As shown in FIG. 18, when the game processing is started, the processor 81 executes initial processing in a step S1. Here, the processor 81 places the player character 202, the non-player character(s) and the background object(s) at their initial positions in the virtual space. However, when starting the game from the last time, the player character 202, the non-player character(s) and the background object (s) are placed at positions at the time of saving. At this time, the coordinate data of the initial positions or the positions at the time of saving of the player character 202 and the non-player character(s) are stored in the data storage area 854 as the current position data 854$d$. Moreover, the processor 81 sets the physical strength value corresponding to the physical strength value data 854$e$ as a maximum value while setting the identification information of the operation mode indicated by the operation mode data 854$c$ as the identification information of the first operation mode.

In a next step S3, the operation data is detected. Subsequently, it is determined, in a step S5, whether the operation is still being received. Here, the processor 81 determines whether the operation on the player character 202 and the sub-character 210 is received in any one of the first operation mode to the third operation mode. In this embodiment, the processor 81 does not receive the operation of the player during the operation mode is being changed, such as a case of reproducing an animation that makes the sub-character 210 appear in the virtual space, and a case of reproducing an animation that the player character 202 is erased from the virtual space. However, the connection object 212 is made to appear with the appearance of the sub-character 210, and the connection object 212 is erased with erasure of the sub-character 210. In addition to this, there is a period of not receiving the operation while reproducing a predetermined animation when performing a specific technique, when receiving a powerful attack by the enemy, or the like. Moreover, there are scenes where an operation of the player is not received, such as when reproducing an animation expressing game clear, reproducing an animation expressing game over, and when a predetermined event occurs. Hereinafter, in description of the game processing, such animations are called "predetermined animation". However, since the detection processing (S3) of the operation data is performed even if an operation of the player is not being received, in this case, the detected operation data is not used for the processing of the processor 81.

If "NO" is determined in the step S5, that is, if an operation is not being received, other processing is performed in a step S7, and then, the progress proceeds to a step S51 shown in FIG. 20. In this case, the operation data detected in the step S3 is not used for the processing of the processor 81. Moreover, the processor 81 advances the above-mentioned predetermined animation by one frame (or reproduces the animation by one frame) in the step S7. That is, the position and posture of each of the characters in the virtual space are updated by one frame.

On the other hand, if "YES" is determined in the step S5, that is, if an operation is being received, it is determine, in a step S9, whether the operation mode is the first operation mode. Here, the processor 81 determines, with reference to the operation mode data 854c, whether the identification information of the first operation mode is described. The same or similar processing will be performed for a step S21 mentioned later.

If "YES" is determined in the step S9, that is, if the operation mode is the first operation mode, the physical strength value is increased by a predetermined quantity (for example, 0.05) in a step S11. However, when the physical strength value is the maximum value, the processing of step S11 is skipped.

Subsequently, it is determine, in a step S13, whether an appearance instruction of a sub-character (that is, sub-character 210) is performed. Here, the processor 81 determines whether the operation data detected in the step S3 indicates the depression of the ZL-button 39.

If "YES" is determined in the step S13, that is, if executing the appearance instruction of the sub-character 210, appearance of the sub-character 210 is started in a step S15. That is, the processor 81 starts to reproduce an animation making the sub-character 210 appear in the virtual space. In a subsequent step S17, the operation mode is shifted to the second operation mode, and then, the process proceeds to the step S51. In the step S17, the processor 81 rewrites the operation mode data 854c to the identification information of the second operation mode. This is the same for steps S29, S33, S43 and S47 mentioned later.

On the other hand, if "NO" is determined in the step S13, that is, if not executing the appearance instruction of sub-character 210, processing in the first operation mode is performed in a step S19, and then, the process proceeds to the step S51.

In the step S19, the processor 81 makes the player character 202 move according to an operation of the analog stick 32, or makes the player character 202 perform attack according to an operation of the ZR-button 61.

Moreover, in the step S19, the processor 81 makes a virtual camera move according to an operation of the analog stick 52.

Furthermore, in the step S19, the processor 81 reproduces an animation at the time that the player character 202 receives the attack of the enemy character 204, or an animation at the time that the enemy character 204 receives the attack of the player character 202.

However, since a scan time of the steps S3-S55 shown in FIG. 18-FIG. 20 is one frame, in the step S19, the position of the player character 202 is moved, the posture (or body) accompanying the movement or attack is changed, or the animation is gone on or reproduced by one frame, respectively.

Moreover, if "NO" is determined in the above-mentioned step S9, that is, if the operation mode is not the first operation mode, it is determined, in the step S21, whether the operation mode is the second operation mode. If "YES" is determined in the step S21, that is, if the operation mode is the second operation mode, the process proceeds to a step S23 shown in FIG. 19. If "NO" is determined in the step S21, that is, if the operation mode is the third operation mode, the process proceeds to a step S37 shown in FIG. 20.

As shown in FIG. 19, the physical strength value is reduced by a predetermined quantity (for example, 0.05) in the step S23, and it is determined, in a step S25, whether it is erasure of the sub-character 210. Here, the processor 81 determines whether the operation data detected in the step S3 indicates depression of the R-button 60, and whether the physical strength value indicated by the physical strength value data 854e is 0 (zero). The processor 81 decides to erase the sub-character 210, when the operation data detected in the step S3 indicating the depression of the R-button 60, or when the physical strength value indicated by the physical strength value data 854e is 0 (zero). On the other hand, the processor 81 decides not to erase the sub-character 210, when the operation data detected in the step S3 does not indicate of the depression of the R-button 60, and when the physical strength value indicated by the physical strength value data 854e is not 0 (zero).

If "YES" is determined in the step S25, that is, if it is the erasure of the sub-character 210, the erasure of the sub-character 210 is started in a step S27. That is, the processor 81 starts to reproduce an animation erasing the sub-character 210. In the next step S29, the operation mode is shifted to the first operation mode, and then, the process proceeds to the step S51.

On the other hand, if "NO" is determined in the step S25, that is, if it is not the erasure of the sub-character 210, it is determined, in a step S31, whether it is a direct operation instruction. Here, the processor 81 determines whether a time period that the ZL-button 39 is continuously depressed exceeds a predetermined time period (for example, 0.5 seconds) with reference to a count value of the timer 854f.

If "YES" is determined in the step S31, that is, if there is the direct operation instruction, the operation mode is shifted to the third operation mode in the step S33, and then, the process proceeds to the S51. On the other hand, if "NO" is determined in the step S31, that is, if there is not the direct operation instruction, the processing in the second operation mode is performed in a step S35, and then, the process proceeds to the S51.

The processor 81 controls the movement of the player character 202 in the step S35 according to the operation of the analog stick 32. That is, the position coordinate data of the current position of the player character 202 in the current position data 854d is updated.

Moreover, in the step S35, the processor 81 moves the virtual camera according to the operation of the analog stick 52.

Furthermore, in the step S35, the processor 81 controls, when the ZL-button 39 is not operated, the motion of the sub-character 210 so as to attack the enemy character 204 nearest to the sub-character 210 irrespective of other type operation. However, if the enemy character 204 does not exist in the virtual space or in the moving range of the sub-character 210, the sub-character 210 is moved so as to follow the movement of the player character 202. Following the movement of the player character 202 or the sub-character 210, the connection object 212 is also moved and deformed.

Furthermore, in the step S35, if the ZL-button 39 is depressed when the enemy character 204 does not exist in the virtual space or in the movable range of the sub-character 210, an animation is started to be reproduced, in which the sub-character 210 is moved (appears) so as to jump out in a direction from the player character 202 to the virtual camera (i.e., imaging direction).

Moreover, in the step S35, when the ZL-button 39 is operated in time with the attack by the continuous technique of the player character 202, the processor 81 reproduces an animation that the sub-character 210 effectively attacks the enemy character 204 following the continuous attack of the player character 202.

Furthermore, in the step S35, the processor 81 reproduces an animation at the time that the player character 202 or the sub-character 210 receives the attack of the enemy character 204, or an animation at the time that the enemy character 204 receives the attack of the player character 202 or/and the sub-character 210.

Furthermore, in the step S35, the processor 81 updates the timer 854f when the ZL-button 39 is depressed, and resets the timer 854f when the ZL-button 39 is not depressed.

However, since the scan time of the steps S3-S55 shown in FIG. 18-FIG. 20 is one frame as mentioned above, in the step S35, the position of the player character 202 or/and the sub-character 210 is moved, the posture (or body) of the player character 202 or/and the sub-character 210 accompanying the movement, or the posture (or body) of the sub-character 210 accompanying the attack of the sub-character 210 is changed by one frame, respectively. Moreover, following on the movement of the player character 202 or/and the sub-character 210, the connection object 212 is moved or/and deformed by one frame. Furthermore, an animation for one frame is reproduced in the step S35. If making it not receive an operation during a predetermined time period after the animation reproduction starts, the animation is continued in step S7 from a next frame until an operation becomes to be received. These are the same for a step S49 mentioned later.

As shown in FIG. 20, in the step S37, the physical strength value is reduced by the predetermined quantity. In a next step S39, it is determined whether it is erasure of the sub-character 210. If "YES" is determined in the step S39, the erasure of the sub-character 210 is started in a step S41, and shifting to the first operation mode in the step S43, and then, the process proceeds to the step S51.

If "NO" is determined in the step S39, it is determined, in a step S45, whether it is cancel of the direct operation instruction. Here, it is determined that it is the cancel of the direct operation instruction if the operation data detected in the step S3 does not indicate the depression of the ZL-button 39. However, it is also determined that it is the cancel of the direct operation instruction when no operation data is detected in the step S3.

If "YES" is determined in the step S45, that is, if it is the cancel of the direct operation instruction, the operation mode is shifted to the second operation mode in the step S47, and the process proceeds to the step S51. Moreover, the processor 81 resets the timer 854f. On the other hand, if "NO" is determined in the step S45, that is, if it is not the cancel of the direct operation instruction, the processing in the third operation mode is performed in the step S49, and the process proceeds to the step S51.

In the step S49, the processor 81 makes the player character 202 move according to the operation of the analog stick 32, or moves the sub-character 210 according to the operation of the analog stick 52. The current position data 854d is updated at this time. However, since the operation mode is still the third operation mode, the ZL-button 39 is in a state of being depressed. The same applies hereinafter.

Moreover, in the step S49, the processor 81 shortens the connection object 212 according to the operation of the ZR-button 61, and makes the player character 202 move so as to be brought close to the sub-character 210.

Furthermore, in the step S49, the processor 81 hooks the connection object 212 on the enemy character 204 or winds the connection object 212 around the enemy character 204 according to a positional relationship of the player character 202, the sub-character 210 and the enemy character 204. Moreover, after winding the connection object 212 around the enemy character 204 one round, an animation that the player character 202 and the sub-character 210 bind the enemy character 204 using the connection object 212 is reproduced.

Furthermore, in the step S49, the processor 81 reproduces an animation at the time that the player character 202 or the sub-character 210 received the attack of the enemy character 204, or an animation at the time that the enemy character 204 is attacked by hooking or winding the connection object 212 on the enemy character 204.

In the step S51, the processing the other character or/and object is performed. Here, the processor 81 makes the non-player character including the enemy character 204 move, or the background object change.

In a next step S53, a game image generated based on the object(s) arranged in the virtual space through the above-mentioned processing. The generated game image is displayed on the display 12. Then, it is determined, in a step S55, whether it is a game end. Here, the processor 81 determines whether it is a game clear or game over. In addition, when the operation data detected in the step S3 indicates an instruction of the game end, the game is forcibly ended even during the game processing. Moreover, although illustration is omitted, a sound required for a game (hereinafter, a "game sound") is generated simultaneously or almost simultaneously with the processing of the step S53, and the generated game sound is output from the speaker 88 (or sound input/output terminal 25).

If "NO" is determined in the step S55, that is, if it is not the game end, the process returns to the step S3 shown in FIG. 18. On the other hand, if "YES" is determined in the step S55, that is, if it is the game end, the game processing is ended.

According to this embodiment, since it is possible, in accordance with selection by the player, to switch whether making the sub-character appear or not in the virtual space, or to switch whether the sub-character is to be controlled automatically or manually, whereby the variation of the operation can be increased, and thus, it is possible to play the game with a simple operation if needed. For example, when feeling that an operation is complicated, or in a scene where a complicated operation is not required, it is possible to play with switching to a simple operation.

Moreover, according to this embodiment, since the third operation mode is maintained during when the predetermined operation button such as the ZL-button is continuously depressed, whereby at least the movement of the player character and the sub-character can be controlled, respectively, it is necessary to perform an operation for continuing the third operation mode and an operation for at least making the player character and the sub-character move, respectively. That is, by making an operation that is difficult to maintain the third operation mode for a long time, instead of always playing the game in the third operation mode, it is possible to prompt the player to determine an appropriate situation and switch to the third operation mode. Accordingly, it is possible to induce the player to perform a difficult or complicated operation for a short time and to basically perform a relatively simple operation for a long time. In addition, the operation mode may be switched to the third mode by depressing a predetermined button once in another embodiment.

Furthermore, according to this embodiment, it is necessary for the player to consider strategy that makes the sub-character appear or disappear according to the physical strength value in order to control whether it is possible to use the sub-character according to the physical strength value. That is, by setting the physical strength value, it is possible to induce the player to return to a simple operation without continuing a difficult or complicated operation for a long time. In addition, the physical strength value may be another parameter including energy, vitality, etc. in another embodiment. Moreover, it is also possible not to use the physical strength value if needed.

In addition, although it is made to appear the sub-character in the virtual space, or disappear from the virtual space, it does not need to be limited to this. In another embodiment, a sub-character exists in the virtual space in an inoperable state in the first operation mode, but may appear in an operable state according to an operation of the player. In such a case, the sub-character is changed in the virtual space from an operable state to an inoperable state according to the operation of the player or the physical strength value having become 0 (zero). That is, the sub-character of an operable state is erased. For example, in the inoperable state in the virtual space, the sub-character is contained in a predetermined item possessed by the player character, or exists while being changed to another inoperable object or item. In such a case, when the sub-character appears in the virtual space in an operable state, the sub-character jumps out of the predetermined item, or is changed from the other inoperable object or item. That is, the sub-character appears in the virtual space in an operable state.

Moreover, in this embodiment, when the sub-character 210 is erased (that is, in the first operation mode), the numerical value of the parameter (that is, the physical strength value) is increased, and when the sub-character 210 appears in the virtual space (that is, in the second operation mode and the third operation mode), the numerical value of the parameter is decreased, but it does not need to be limited to this. Depending on a type of the parameter, the numerical value of the parameter may be decreased when the sub-character 210 is erased, and the numerical value of the parameter may be increased when the sub-character 210 appears in the virtual space. In such a case, the parameter may be a numerical value of the physical strength that the sub-character 210 exhausted, for example, and if the numerical value becomes a maximum value (for example, 100), it is erased from the virtual space, the sub-character 210 cannot be made to appear in the virtual space until the physical strength is recovered completely (the numerical value of the parameter becomes 0). However, when the sub-character 210 is erased before the numerical value of the parameter reaches the maximum value, even if it is before the numerical value of the parameter becomes 0, the sub-character 210 can be made to appear in the virtual space.

Furthermore, although the game system 1 is shown as an example of an information processing system in the above-mentioned embodiment, it does not need to be limited to such structure, and it is possible to adopt other structure. For example, although the above-mentioned "computer" is a single computer (specifically, the processor 81) in the above-mentioned embodiment, it may be composed of a plurality of computers in another embodiment. The above-mentioned "computer" may be (a plurality of) computers provided in a plurality of apparatuses, for example, and more specifically, the above-mentioned "computer" may be constituted by the processor 81 of the main body apparatus 2 and the communication control sections (microprocessors) 101 and 111 provided in the controllers.

Furthermore, in another embodiment, the game processing shown in FIG. 18-FIG. 20 may be executed by a server on a network such an internet. In such a case, the processor 81 of the main body apparatus 2 sends the operation data received from the left controller 3 and the right controller 4 to the above-mentioned server via the network communication section 82 and the network, and receives a result of the game processing executed by the server (that is, data of the game image and data of the game sound), thereby to display the game image on the display 12 and to output the game sound from the speaker 88. That is, it is possible to constitute an information processing system that includes the game system 1 shown in the above-mentioned embodiment and the server on the network.

Moreover, the above-mentioned embodiment is described on a case where the game image is displayed on the display 12, but it does not need to be limited to this. The game image can also be displayed on a stationary type monitor by connecting the main body apparatus 2 to the stationary type monitor (for example, television monitor) via a cradle. In such a case, it is possible to constitute an information processing system that includes the game system 1 and the stationary type monitor.

Furthermore, although the above-mentioned embodiment is described on a case where the game system 1 having structure that the left controller 3 and the right controller 4 are attachable and detachable to or from the main body apparatus 2 is used, it does not need to be limited to this. For example, it is possible to use an information processing apparatus such a game apparatus that an operation portion having operation buttons and analog sticks similar to those of the left controller 3 and the right controller 4 is provided integrally with the main body apparatus 2 or further electronic equipment capable of executing a game program. The further electronic equipment corresponds to smartphones, tablet PCs or the like. In such a case, an operation portion may comprise software keys.

Furthermore, specific numeral values and images shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium having stored therein an information processing program executable by a computer of an information processing apparatus, wherein the information processing program is configured to cause one or more processors of the computer to at least execute:

acquiring operation data based on an operation input to an operation device by a player;

controlling a player character in a virtual space based on the operation data;

in the controlling of the player character based on the operation data, in a first operation mode, controlling the player character based on a first operation input, and in response to a first switching instruction input, making a sub-character appear in the virtual space and shifting to a second operation mode, in the second operation mode, controlling the player character based on the first operation input, automatically controlling an action of at least a part of the sub-character, and in response to a second switching instruction input, shifting to a third operation mode, and in the third operation mode, controlling the player character based on the first operation input, and controlling movement of at least the sub-character based on a second operation input;

storing a parameter relevant to the sub-character into a memory of the information processing apparatus;

decreasing the parameter in the second operation mode and the third operation mode;

increasing the parameter in the first operation mode; and shifting to the first operation mode while erasing the sub-character when the parameter is decreased to a predetermined value in the second operation mode or the third operation mode.

2. The storage medium according to claim 1, wherein the information processing program is configured to further cause the one or more processors of the computer to at least execute: erasing the sub-character and shifting to the first operation mode in response to a third switching instruction input in the second operation mode or the third operation mode.

3. The storage medium according to claim 1, wherein the operation device is provided with a first direction input portion and a second direction input portion, and the first operation input is a direction input to the first direction input portion, and the second operation input is a direction input to the second direction input portion.

4. The storage medium according to claim 3, wherein the information processing program is configured to further cause the one or more processors of the computer to at least execute:

controlling a virtual camera based on the second operation input in the first operation mode and the second operation mode; and automatically controlling the virtual camera based on positions of the player character and the sub-character in the third operation mode.

5. The storage medium according to claim 1, wherein a connection object that connects the player character and the sub-character is connected to the sub-character, and the information processing program is configured to further cause the one or more processors of the computer to at least execute: controlling the connection object according to positions and motion of the player character and the sub-character in the second operation mode or the third operation mode.

6. The storage medium according to claim 1, wherein the information processing program is configured to further cause the one or more processors of the computer to at least execute: making the player character attack an enemy character in the virtual space based on an attack instruction input.

7. The storage medium according to claim 6, wherein a connection object that connects the player character and the sub-character is connected to the sub-character, and the information processing program is configured to further cause the one or more processors of the computer to at least execute:

controlling the connection object according to positions and motion of the player character and the sub-character in the second operation mode or the third operation mode; and making the player character and the sub-character perform a predetermined action based on a positional relationship between the connection object and the enemy character.

8. The storage medium according to claim 1, wherein the second switching instruction input is a continuation of an input to a predetermined key of the operation device, and the information processing program is configured to further cause the one or more processors of the computer to execute: shifting to the second operation mode when the input to the predetermined key is canceled in the third operation mode.

9. An information processing system comprising one or more processors and an operation portion, wherein the one or more processors are configured to at least execute:

acquiring operation data based on an operation input to the operation portion;

controlling a player character in a virtual space based on the operation data;

in the controlling of the player character based on the operation data, in a first operation mode, controlling the player character based on a first operation input, and in response to a first switching instruction input, making a sub-character appear in the virtual space and shifting to a second operation mode, in the second operation mode, controlling the player character based on the first operation input, automatically controlling an action of at least a part of the sub-character, and in response to a second switching instruction input, shifting to a third operation mode, and in the third operation mode, controlling the player character based on the first operation input, and controlling movement of at least the sub-character based on a second operation input;

storing a parameter relevant to the sub-character into a memory of the information processing system;

decreasing the parameter in the second operation mode and the third operation mode;

increasing the parameter in the first operation mode; and shifting to the first operation mode while erasing the sub-character when the parameter is decreased to a predetermined value in the second operation mode or the third operation mode.

10. The information processing system according to claim 9, wherein the one or more processors are configured to further execute at least: erasing the sub-character and shifting to the first operation mode in response to a third switching instruction input in the second operation mode or the third operation mode.

11. The information processing system according to claim 9, wherein the operation portion is provided with a first direction input portion and a second direction input portion, and the first operation input is a direction input to the first direction input portion, and the second operation input is a direction input to the second direction input portion.

12. The information processing system according to claim 11, wherein the one or more processors are configured to further execute at least:
controlling a virtual camera based on the second operation input in the first operation mode and the second operation mode; and
automatically controlling the virtual camera based on positions of the player character and the sub-character in the third operation mode.

13. The information processing system according to claim 9, wherein a connection object that connects the player character and the sub-character is connected to the sub-character, and the one or more processors are configured to further execute at least: controlling the connection object according to positions and motion of the player character and the sub-character in the second operation mode or the third operation mode.

14. The information processing system according to claim 9, wherein one or more processors are configured to further execute at least: making the player character attack an enemy character in the virtual space based on an attack instruction input.

15. The information processing system according to claim 14, wherein a connection object that connects the player character and the sub-character is connected to the sub-character, and the one or more processors are configured to further execute at least:
controlling the connection object according to positions and motion of the player character and the sub-character in the second operation mode or the third operation mode; and
making the player character and the sub-character perform a predetermined action based on a positional relationship between the connection object and the enemy character.

16. The information processing system according to claim 9, wherein the second switching instruction input is a continuation of an input to a predetermined key of the operation portion, and the one or more processors are configured to further execute at least: shifting to the second operation mode when the input to the predetermined key is canceled in the third operation mode.

17. An information processing apparatus comprising one or more processors, wherein the one or more processors are configured to at least execute:
acquiring operation data based on an operation input to an operation device by a player;
controlling a player character in a virtual space based on the operation data;
in the controlling of the player character based on the operation data,
in a first operation mode, controlling the player character based on a first operation input, and in response to a first switching instruction input, making a sub-character appear in the virtual space and shifting to a second operation mode,
in the second operation mode, controlling the player character based on the first operation input, automatically controlling an action of at least a part of the sub-character, and in response to a second switching instruction input, shifting to a third operation mode, and
in the third operation mode, controlling the player character based on the first operation input, and controlling movement of at least the sub-character based on a second operation input;
storing a parameter relevant to the sub-character into a memory of the information processing apparatus;
decreasing the parameter in the second operation mode and the third operation mode;
increasing the parameter in the first operation mode; and
shifting to the first operation mode while erasing the sub-character when the parameter is decreased to a predetermined value in the second operation mode or the third operation mode.

18. A game control method, comprising:
acquiring operation data based on an operation input to an operation device by a player;
controlling a player character in a virtual space based on the operation data;
in the controlling of the player character based on the operation data,
in a first operation mode, controlling the player character based on a first operation input, and in response to a first switching instruction input, making a sub-character appear in the virtual space and shifting to a second operation mode,
in the second operation mode, controlling the player character based on the first operation input, automatically controlling an action of at least a part of the sub-character, and in response to a second switching instruction input, shifting to a third operation mode, and
in the third operation mode, controlling the player character based on the first operation input, and controlling movement of at least the sub-character based on a second operation input;
storing a parameter relevant to the sub-character into a memory of an information processing apparatus;
decreasing the parameter in the second operation mode and the third operation mode;
increasing the parameter in the first operation mode; and
shifting to the first operation mode while erasing the sub-character when the parameter is decreased to a predetermined value in the second operation mode or the third operation mode.

* * * * *